US011910506B2

(12) United States Patent
Lin et al.

(10) Patent No.: US 11,910,506 B2
(45) Date of Patent: Feb. 20, 2024

(54) LAMP CONTROLLER

(71) Applicant: Changzhou Jutai Electronic Co., Ltd., Jiangsu (CN)

(72) Inventors: Jun Lin, Jiangsu (CN); Chengqian Pan, Jiangsu (CN); Wei Huang, Jiangsu (CN); Jin Chen, Jiangsu (CN)

(73) Assignee: Changzhou Jutai Electronic Co., Ltd., Changzhou (CN)

( * ) Notice: Subject to any disclaimer, the term of this patent is extended or adjusted under 35 U.S.C. 154(b) by 0 days.

(21) Appl. No.: 17/942,771

(22) Filed: Sep. 12, 2022

(65) Prior Publication Data

US 2024/0023218 A1 Jan. 18, 2024

(30) Foreign Application Priority Data

Jul. 12, 2022 (CN) ......................... 202221793679.0

(51) Int. Cl.

*H05B 47/10* (2020.01)
*F21V 23/00* (2015.01)
*F21V 23/02* (2006.01)
*F21V 23/04* (2006.01)

(52) U.S. Cl.

CPC ........... *H05B 47/10* (2020.01); *F21V 23/003* (2013.01); *F21V 23/023* (2013.01); *F21V 23/04* (2013.01)

(58) Field of Classification Search

CPC ....... H05B 45/10; H05B 47/10; F21V 23/003; F21V 23/023; F21V 23/04

See application file for complete search history.

(56) References Cited

FOREIGN PATENT DOCUMENTS

JP 2013149399 A * 8/2013 ........... H05B 39/044

* cited by examiner

*Primary Examiner* — Jimmy T Vu

(57) ABSTRACT

The present disclosure discloses A lamp controller, comprising a DC power supply and a switch unit, wherein an output end of the DC power supply is electrically connected to the switch unit, the switch unit comprises a first switch set, a second switch set and a control module for controlling the first switch set and the second switch set to be turned on alternately, an output end of the control module is electrically connected to the first switch set, and the output end of the control module forms a second set of switch circuit after being electrically connected to the second switch set; and the lamp controller further comprises a control unit, which is electrically connected to the switch unit; the switch unit further comprises: a first toggle switch.

10 Claims, 39 Drawing Sheets

LAMP CONTROLLER

CROSS-REFERENCE TO RELATED APPLICATION

This application claims priority from the Chinese patent application 2022217936790 filed Jul. 12, 2022, the content of which is incorporated herein in the entirety by reference.

TECHNICAL FIELD

The present disclosure relates to the technical field of light-emitting control of lamps, in particular to a lamp controller.

BACKGROUND ART

With a variety of shapes and flashing light, a festival lamp luster has lighting and decoration effects at night, and meanwhile the festival lamp luster is the first choice for people to add festive air during the festival. The above lighting and decoration effects are that a control signal with a duty cycle is sent to an LED lamp through a controller, and the control signal enables the LED lamp to produce various different flashing effects.

An existing LED lamp controller includes a control unit and a switch unit, the switch unit is connected to an output end of the control unit, the control unit is usually a programmable chip, the switch unit forms two sets of switch circuits through four triodes, and a control module can control the two sets of switch circuits to be turned on alternately, thereby realizing alternate flashing of two circuits of lamp luster connected to the output end. The above two sets of switch circuits exist the following problems:

First, two circuits of load can be connected only, usually each circuit of load is a one-circuit lamp luster, therefore the lamp luster quantity connected to the existing switch unit is less, resulting in limited lighting effect produced during working.

Second, when one switch circuit is damaged, the lamp luster connected to this switch circuit cannot work, at this time, the other switch circuit can work only, so the lamp luster effect becomes worse.

Third, for tour triodes in the switch unit, two triodes in opposite side form a set of switch circuit, and this structure results in a complex circuit structure, requiring more wiring and increasing cost. Moreover, in each switch circuit, only one triode is electrically connected to the control module, namely, in each set of switch circuit, only one triode is controlled to be turned on or turned off through the control module, and the state of the previous triode decides whether to turn on or turn off another triode, therefore another triode cannot be controlled independently.

SUMMARY

The present disclosure provides a lamp controller, and is capable of connecting more lamp lusters, so as to achieve the effect of flashing more light.

A lamp controller, comprising a DC power supply and a switch unit, wherein an output end of the DC power supply is electrically connected to the switch unit, the switch unit comprises a first switch set, a second switch set and a control module for controlling the first switch set and the second switch set to be turned on alternately, an output end of the control module is electrically connected to the first switch set, and the output end of the control module forms a second set of switch circuit after being electrically connected to the second switch set; and the lamp controller further comprises a control unit, which is electrically connected to the switch unit; the switch unit further comprises: a first toggle switch, which forms a first set of switch circuit after being electrically connected to an output end of the first switch set and the control unit in respective; and a second toggle switch, which forms a third set of switch circuit after being electrically connected to the output end of the first switch set and the control unit in respective.

The present disclosure controls the work time of each LED lamp, and different work time may show different lighting effects. Moreover, this implementation mode is respectively connected to a controller through three wires, at least four circuits of LED lamps are also connected among the three wires, apparently, the showed lighting effect is better than that in the prior art. The controller structure and the circuit structure are simpler in a case that the circuit quantity connecting to the lamp is more than that in the prior art, so that the cost will not be increased.

The present disclosure adds a first switch, a second switch and a control unit on the basis of the prior art. Compared with the prior art, the present disclosure can output a larger current and can meet the use of lamps that can withstand a large current.

BRIEF DESCRIPTION OF THE DRAWINGS

FIG. 30*a* to FIG. 31*f* are respectively orthographic views of six surfaces of an appearance of a twentieth lamp controller.

FIG. 31*a* to FIG. 31*f* are respectively orthographic views of six surfaces of an appearance of a twenty-first lamp controller.

DETAILED DESCRIPTION OF THE EMBODIMENTS

Embodiment 1

Figure 1:
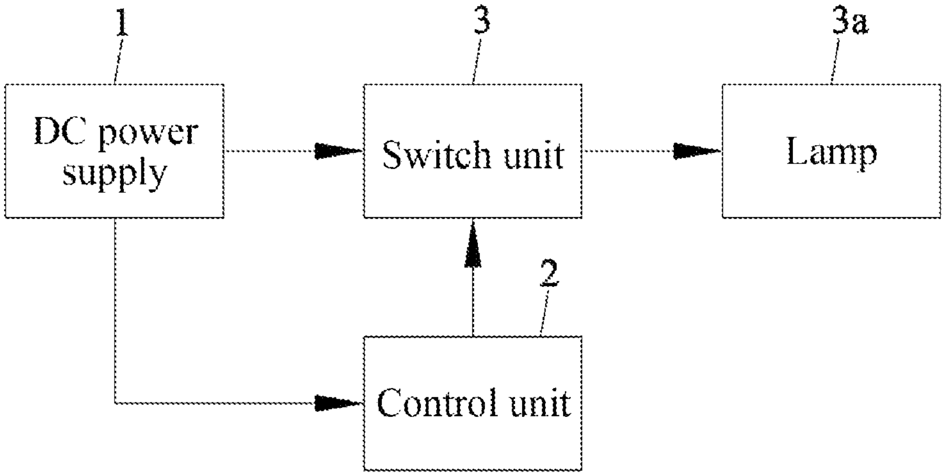
FIG. 1 is a circuit block diagram of a lamp controller in the present disclosure.
Figure 2:
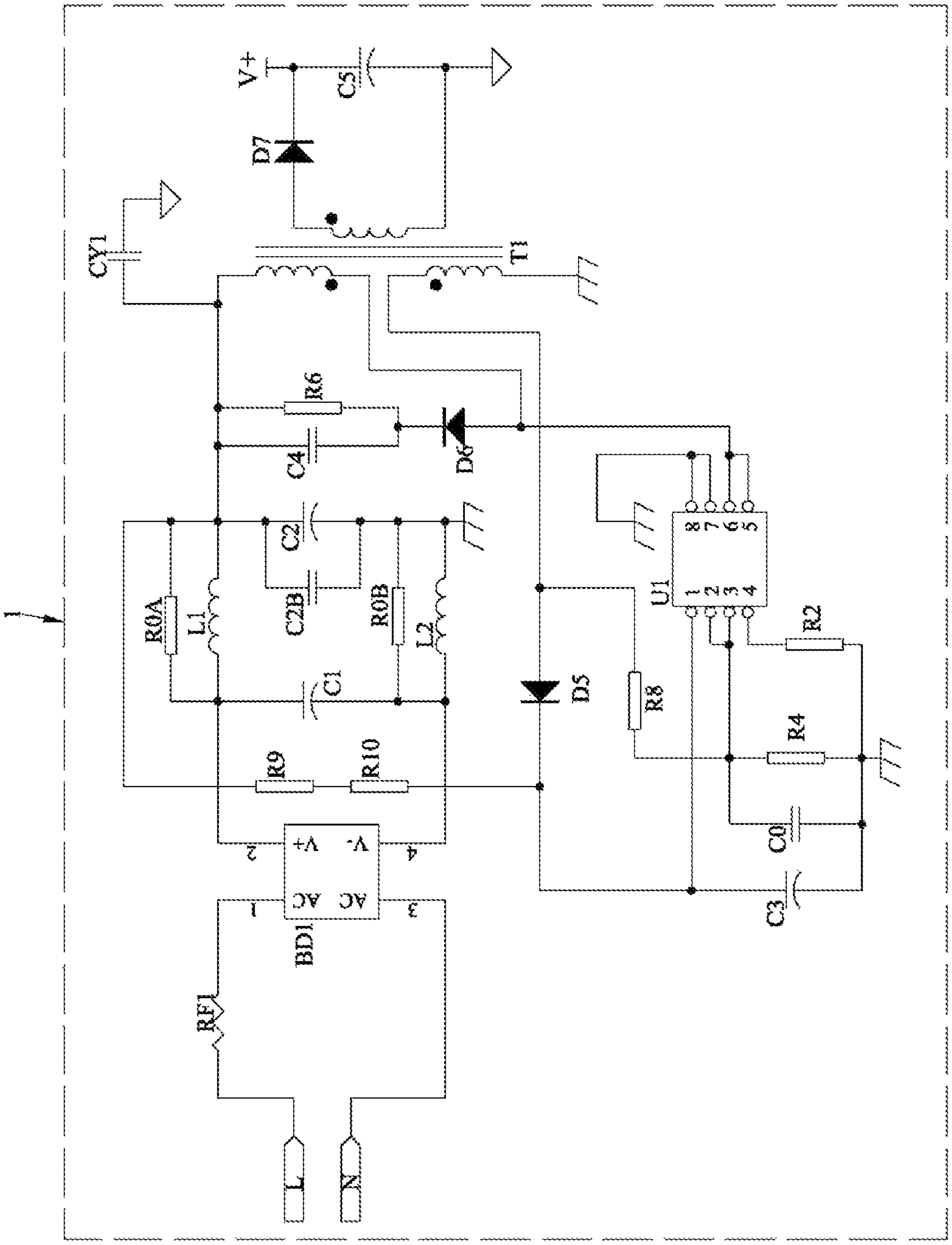
FIG. 2 is a schematic diagram of a DC power supply.

As shown in FIG. 1, a lamp controller in this embodiment includes a DC power supply 1, a control unit 2 and a switch unit 3 that is controlled to be turned on or turned off through the control unit 2, and each part and the relationship among various parts are respectively described in details below:

As shown in FIG. 1 and FIG. 2, an output end of the DC power supply 1 is electrically connected to the control unit 2 and the switch unit 3 in respective, the DC power supply 1 may adopt a battery or a switch power supply, and the switch power supply that transforms alternating current into direct current is preferentially adopted in this embodiment. In this embodiment, the switch power supply includes a rectifier filter circuit, a voltage conversion circuit, a starting circuit and a switch control circuit. Each part of the switch power supply is described in details below:

As shown in FIG. 2, an output end of the rectifier filter circuit is respectively connected to the voltage conversion circuit and the starting circuit, the rectifier filter circuit includes a single-phase full-wave rectifier circuit BD1, first inductance L1, a first capacitor C1, a second capacitor C2, a second parallel capacitor C2B, second inductance L2, a first anti-interference resistor ROA and a second anti-interference resistor ROB, and the single-phase full-wave rectifier circuit is composed of four diodes; an anode output end of the single-phase full-wave rectifier circuit BD1 is respectively connected to one end of the first inductance L1 and one end of the first capacitor C1, the first anti-interference resistor ROA is connected to the two ends of the first inductance L1 in parallel, the other end of the first inductance L1 is connected to one end of the second capacitor C2, the other end of the second capacitor C2 is grounded, the second parallel capacitor C2B is connected to the two ends of the second capacitor C2 in parallel, the other end of the first capacitor C1 is connected to a cathode output end of the single-phase full-wave rectifier circuit BD1, the other end of the first capacitor C1 is also connected to one end of the second inductance L2, the other end of the second inductance L2 is grounded, and the second anti-interference resistor ROB is connected to the two ends of the second inductance L2 in parallel.

As shown in FIG. 2, after being provided to the single-phase full-wave rectifier circuit BD1 for rectifying through a fuse RF1, alternating current voltage is filtered through the first inductance L1, the first capacitor C1, the second capacitor C2 and the second parallel capacitor C2B, and then electromagnetic interference is eliminated through an electromagnetic anti-interference circuit formed by the first inductance L1, the first anti-interference resistor ROA, the second inductance L2 and the second anti-interference resistor ROB, thereby avoiding the influence of an electromagnetic interference signal on output DC voltage. The direct current obtained through the rectifier filter circuit is conveyed to the voltage conversion circuit, and the voltage conversion circuit is a transformer T1, which can transform high voltage into low voltage, to be used by the follow-up control unit 2 and the switch unit 3. The transformer T1 and the first inductance L1 are provided with safety capacitors CY1, and one end of the safety capacitor CY1 is connected to the ground.

As shown in FIG. 2, the switch power supply further includes a rectifier diode D7 and a fifth capacitor C5, an anode end of the rectifier diode D7 is connected to an output end of the voltage conversion circuit, a cathode end of the rectifier diode D7 is connected to one end of the fifth capacitor C5, and the other end of the fifth capacitor C5 is grounded. After secondary output voltage of the transformer T1 is rectified through the rectifier diode D, direct current voltage is obtained, namely, an output end V+ of the DC power supply 1, and the direct current voltage charges the fifth capacitor C5.

As shown in FIG. 2, the starting circuit includes a first current-limiting resistor R9 and a second current-limiting resistor R10, one end of the first current-limiting resistor R9 is connected to the other end of the first inductance L1 while the other end of the first current-limiting resistor R9 is connected to one end of the second current-limiting resistor R10, and the other end of the second current-limiting resistor R10 is electrically connected to the switch control circuit.

As shown in FIG. 2, the switch control circuit is electrically connected to the rectifier filter circuit and the voltage conversion circuit in respective. The switch control circuit includes a power control chip U1, a second resistor R2, a third capacitor C3, a first voltage sampling resistor R8, a second voltage sampling resistor R4 and a voltage sampling filter capacitor C0, an output end of the power control chip U1 is connected to the transformer T1, and the power control chip U1 is grounded through the second resistor R2. One end of the third capacitor C3 is respectively connected to the other end of the second current-limiting resistor R10 and the power control chip U1, the other end of the third capacitor C3 is grounded, an auxiliary winding of the transformer T1 is connected to the third capacitor C3 through a fifth diode D5, one end of the first voltage sampling resistor R8 is connected to the auxiliary winding of the transformer T1, and the other end of the first voltage sampling resistor R8 is respectively connected to the second voltage sampling resistor R4 and the power control chip U1.

As shown in FIG. 2, during the initial power-on period of the switch power supply, the current output by the rectifier filter circuit is provided to the third capacitor C3 after being limited through the first current-limiting resistor R9 and the second current-limiting resistor R10, so as to charge the third capacitor C3; the voltage released by the third capacitor C3 is provided to the power control chip U1, and the power control chip U1 is powered on to work, so the switch control circuit is started to work. An electrical signal of a primary winding of the transformer T1 is provided to the power control chip U1 after being sampled through the first voltage sampling resistor R8 and the second voltage sampling resistor R4, the power control chip U1 compares the electrical signal with an output voltage value set inside the power control chip U1, and if the electrical signal is unequal to the output voltage value, the power control chip U1 will output a control signal to adjust the output voltage. A power tube is integrated inside the power control chip U1, and the power control chip U1 adjusts the output voltage by controlling the time for turning on or turning off the power tube.

As shown in FIG. 2, a negative peak absorption circuit is also connected between the switch control circuit and the transformer T1, the negative peak absorption circuit includes a fourth capacitor C4, a sixth resistor R6 and a sixth diode D6, one end of the fourth capacitor C4 is connected to the other end of the first inductance L1, the other end of the fourth capacitor C4 is connected to a cathode end of the sixth diode D6, an anode end of the sixth diode D6 is connected to an output end of the power control chip U1, and the sixth resistor R6 is connected to the two ends of the fourth capacitor C4 in parallel.

Figure 3:
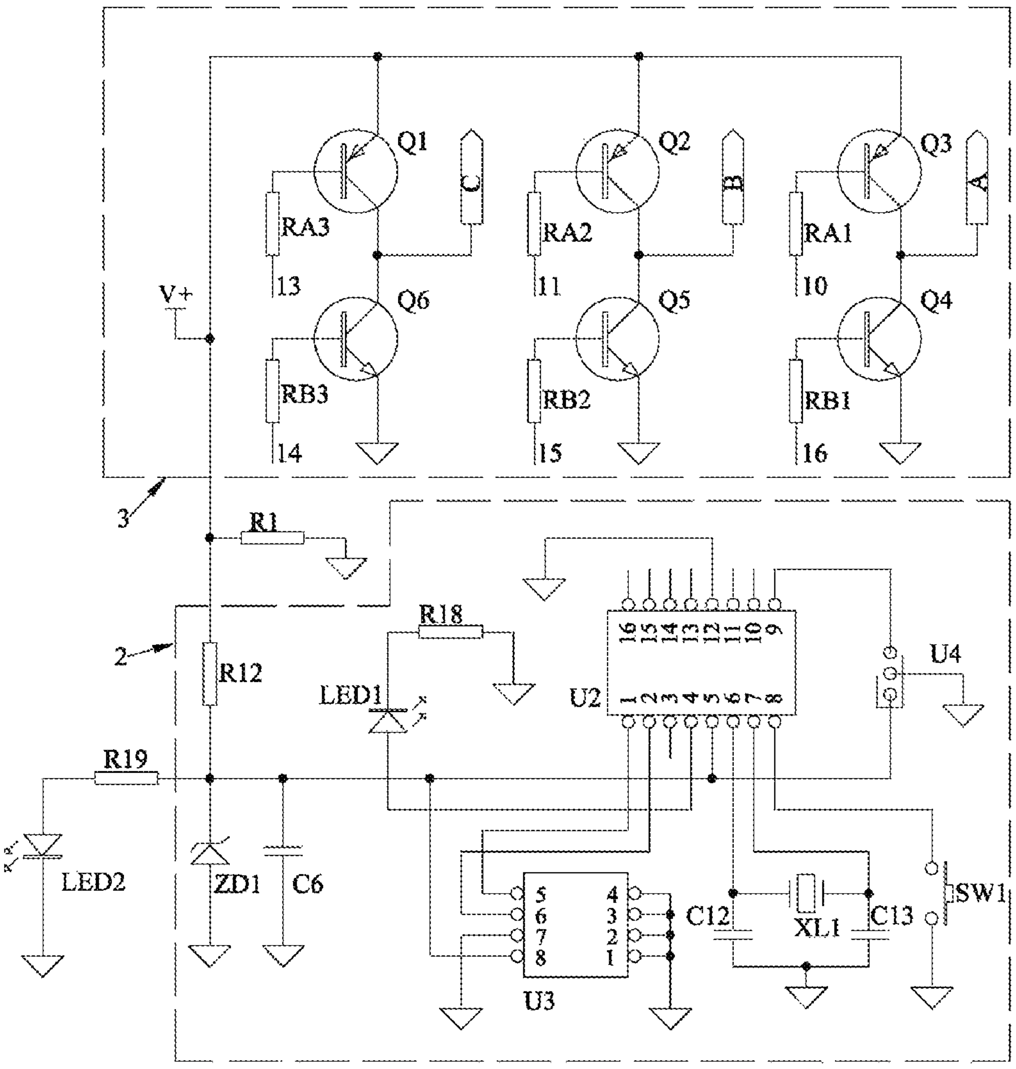
FIG. 3 is a schematic diagram of a first control unit and a switch unit in the present disclosure.

As shown in FIG. 3, the control unit 2 includes a microcontroller U2, a clock circuit and a memory chip U3. The microcontroller U2 is connected to an output end V+ of the DC power supply, and the microcontroller U2 is MCU. Since the microcontroller U2 is a programmable controller, when a mode selector sends an operation signal to the microcontroller U2, the microcontroller U2 sends a control signal enabling the lamp 3*a* to work according to a programming rule.

As shown in FIG. 3, in this embodiment, the preferred mode is as follows: a voltage-stabilizing filter circuit is arranged between the output end V+ of the DC power supply 1 and the microcontroller U2, the voltage-stabilizing filter circuit includes a twelfth resistor R12, a voltage-stabilizing diode ZD1 and a sixth capacitor C6, one end of the twelfth resistor R12 is connected to the output end V+ of the DC power supply, the other end of the twelfth resistor R12 is connected to a cathode end of the voltage-stabilizing diode ZD1, an anode end of the voltage-stabilizing diode ZD1 is grounded, one end of the sixth capacitor C6 is connected to the cathode end of the voltage-stabilizing diode ZD1, the other end of the sixth capacitor C6 is grounded, and a pin 5 of the microcontroller U2 is connected to one end of the sixth capacitor C6.

As shown in FIG. 3, the clock circuit includes a crystal oscillator XL1, a twelfth capacitor C12 and a thirteenth capacitor C13, the two ends of the crystal oscillator XL1 are respectively connected to the pin 6 and the pin 7 of the microcontroller U2, one end of the twelfth capacitor C12 is connected to one end of the crystal oscillator XL1, the other end of the twelfth capacitor C12 is grounded, one end of the thirteenth capacitor C13 is connected to the other end of the crystal oscillator XL1, and the other end of the thirteenth capacitor C13 is grounded.

As shown in FIG. 3, the pin 8 of the memory chip U3 is connected to the output end V+ of the DC power supply, after setting the voltage-stabilizing filter circuit, preferably, the pin 8 of the memory chip U3 is connected to one end of the sixth capacitor C6. The pins 1, 2, 3, 4 and 7 of the memory chip U3 are grounded, the pin 5 of the memory chip U3 is connected to the pin 1 of the microcontroller U2, the pin 6 of the memory chip U3 is connected to the pin 2 of the microcontroller U2, the current working mode is output to the memory chip U3 through the microcontroller U2, so that the memory chip U3 can record the working mode. After power failure, the working mode of the microcontroller U2 before stopping work is still recorded in the memory chip U3; and after the microcontroller U2 is powered on again, the microcontroller U2 reads the recorded working mode from the memory chip U3, and sends a control signal to a loading lamp 3*a* in this working mode. Except that the memory chip U3 is configured outside the microcontroller U2, the memory chip U3 may also be set inside the microcontroller U2. Certainly, the memory chip U3 is not necessary, namely, whether to connect U3 may be decided according to needs.

As shown in FIG. 3, the switch unit 3 in this embodiment includes three sets of switch circuits, each set of switch circuit includes a load connecting part as well as a first switch tube and a second switch tube that are independently controlled by the control unit, the first switch tube and the second switch tube may be a triode or a MOS tube. The triode is taken as an example for illustration in this embodiment, wherein the first switch tube is replaced by the first triode for illustration, and the second switch tube is replaced by a second triode for illustration.

A base electrode of the first triode is connected to an output end of the control unit 2, an emitting electrode of the first triode is configured to connect to the DC power supply, a collecting electrode of the first triode is connected to a collecting electrode of a second triode, a base electrode of the second triode is connected to the output end of the control unit 2, an emitting electrode of the second triode is grounded, and the load connecting part is arranged at the connecting part of the collecting electrode of the first triode and the collecting electrode of the second triode.

As shown in FIG. 3, in this embodiment, the first triode Q3 in the first set of switch circuit is a PNP triode or a P-channel MOS tube, the second triode Q4 in the first set of switch circuit is a NPN triode or a N-channel MOS tube, the base electrode of the first triode Q3 in the first set of switch circuit is connected to the pin 10 of the microcontroller U2, the base electrode of the first triode Q3 in the first set of switch circuit is preferentially connected to the pin 10 of the microcontroller U2 through the first current-limiting resistor RA1, the emitting electrode of the first triode Q3 in the first set of switch circuit is connected to the output end V+ of the DC power supply, the base electrode of the second triode Q4 in the first set of switch circuit is connected to the pin 16 of the microcontroller U2, the base electrode of the second triode Q4 in the first set of switch circuit is preferentially connected to the pin 16 of the microcontroller U2 through a second current-limiting resistor RB1, the emitting electrode of the second triode Q4 in the first set of switch circuit is grounded, and the load connecting part A in the first set of switch circuit is connected to the connecting part of the collecting electrode of the first triode Q3 in the first set of switch circuit and the collecting electrode of the second triode Q4 in the first set of switch circuit.

As shown in FIG. 3, the first triode Q2 in the second set of switch circuit is a PNP triode or a P-channel MOS tube, the second triode Q5 in the second set of switch circuit is a NPN triode or a N-channel MOS tube, the base electrode of the first triode Q2 in the second set of switch circuit is connected to the pin 11 of the microcontroller U2, the base electrode of the first triode Q2 in the second set of switch circuit is preferentially connected to the pin 11 of the microcontroller U2 through the third current-limiting resistor RA2, the emitting electrode of the first triode Q2 in the second set of switch circuit is connected to the output end V+ of the DC power supply, the base electrode of the second triode Q5 in the second set of switch circuit is connected to the pin 15 of the microcontroller U2, the base electrode of the second triode Q5 in the second set of switch circuit is preferentially connected to the pin 15 of the microcontroller U2 through a fourth current-limiting resistor RB2, the emitting electrode of the second triode Q5 in the second set of switch circuit is grounded, and the load connecting part B in the second set of switch circuit is connected to the connecting part of the collecting electrode of the first triode Q2 in the second set of switch circuit and the collecting electrode of the second triode Q5 in the second set of switch circuit.

As shown in FIG. 3, the first triode Q1 in the third set of switch circuit is a PNP triode or a P-channel MOS tube, the second triode Q6 in the third set of switch circuit is a NPN triode or a N-channel MOS tube, the base electrode of the first triode Q1 in the third set of switch circuit is connected to the pin 13 of the microcontroller U2, the base electrode of the first triode Q1 in the third set of switch circuit is preferentially connected to the pin 13 of the microcontroller U2 through the fifth current-limiting resistor RA3, the emitting electrode of the first triode Q1 in the third set of switch circuit is connected to the output end V+ of the DC power supply, the base electrode of the second triode Q6 in the third set of switch circuit is connected to the pin 14 of the microcontroller U2, the base electrode of the second triode Q6 in the third set of switch circuit is preferentially connected to the pin 14 of the microcontroller U2 through a sixth current-limiting resistor RB3, the emitting electrode of the second triode Q6 in the third set of switch circuit is grounded, and the load connecting part C in the third set of switch circuit is connected to the connecting part of the collecting electrode of the first triode Q1 in the third set of switch circuit and the collecting electrode of the second triode Q6 in the third set of switch circuit.

As shown in FIG. 3, taking the first set of switch circuit as an example, the working process of the first set of switch circuit is described below:

(1) When the pins 10 and 16 of the microcontroller U2 output high level, the first triode Q3 in the first set of switch circuit is turned off, the second triode Q4 in the first set of switch circuit is turned on, and the level of the connecting part of the collecting electrode of the first triode Q3 in the first set of switch circuit and the collecting electrode of the second triode Q4 in the first set of switch circuit is equal to the ground, namely, the low level, at this time, the level of the load connecting part A in the first set of switch circuit is the low level.

(2) When the pins 10 and 16 of the microcontroller U2 output low level, the first triode Q3 in the first set of switch circuit is turned on, the second triode Q4 in the first set of switch circuit is turned off, and the level of the connecting part of the collecting electrode of the first triode Q3 in the first set of switch circuit and the collecting electrode of the second triode Q4 in the first set of switch circuit is from the output end V+ of the DC power supply, namely, the high level, at this time, the level of the load connecting part A in the first set of switch circuit is the high level.

(3) When the pin 10 of the microcontroller U2 outputs high level and the pin 16 of the microcontroller U2 outputs low level, the first triode Q3 in the first set of switch circuit is turned off, the second triode Q4 in the first set of switch circuit is turned off, and the connecting part of the collecting electrode of the first triode Q3 in the first set of switch circuit and the collecting electrode of the second triode Q4 in the first set of switch circuit has no output.

(4) When the pin 10 of the microcontroller U2 outputs low level and the pin 16 of the microcontroller U2 outputs high level, the first triode Q3 in the first set of switch circuit is turned on, the second triode Q4 in the first set of switch circuit is turned on, and the current from the output end V+ of the DC power supply flows to the ground directly, thereby causing the short circuit of the first set of switch circuit, and this situation is not allowed.

As shown in FIG. 3, since the load connecting parts of three sets of switch circuits may output high level or low level, and control the duty cycle output by each switch circuit, the load lamp 3*a* may show different flashing modes according to a circuit structure of the load lamp 3*a*.

Figure 4:
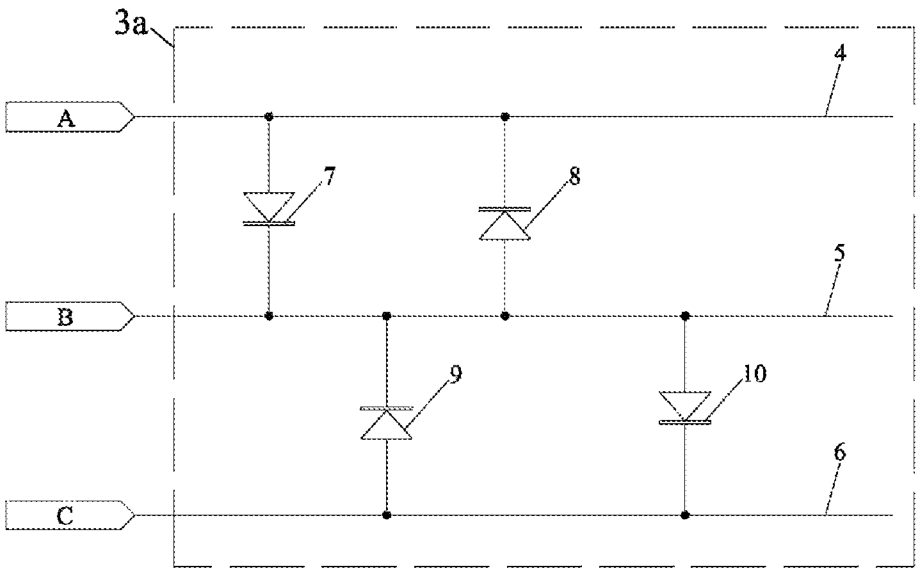
FIG. 4 is a wiring diagram of a three-wire and four-circuit lamp.

As shown in FIG. 3 and FIG. 4, the lamp 3*a* in this embodiment includes a first wire 4, a second wire 5, a third wire 6, a first LED lamp 7, a second LED lamp 8, a third LED lamp 9 and a fourth LED lamp 10, the first wire 4 is connected to the load connecting part A of the first set of switch circuit, the second wire 5 is connected to the load connecting part B of the second set of switch circuit, and the third wire 3 is connected to the load connecting part C of the third set of switch circuit.

As shown in FIG. 3 and FIG. 4, an anode end of the first LED lamp 7 is connected to the first wire 4, and a cathode end of the first LED lamp 7 is connected to the second wire 5; a cathode end of the second LED lamp 8 is connected to the first wire 4, and an anode end of the second LED lamp 8 is connected to the second wire 5; a cathode end of the third LED lamp 9 is connected to the second wire 5, and an anode end of the third LED lamp 9 is connected to the third wire 6; and an anode end of the fourth LED lamp 10 is connected to the second wire 5, and a cathode end of the fourth LED lamp 10 is connected to the third wire 6.

As shown in FIG. 3 and FIG. 4, based on the circuit structure of the above lamp 3*a*, the working is divided into the following states:

(1) As shown in FIG. 3 and FIG. 4, the load connecting part A of the first set of switch circuit outputs high level, the load connecting part B of the second set of switch circuit and the load connecting part C of the third set of switch circuit output low level, so that the first LED lamp 7 works, and the remaining LED lamps are extinguished.

(2) As shown in FIG. 3 and FIG. 4, the load connecting part A of the first set of switch circuit outputs low level, the load connecting part B of the second set of switch circuit and the load connecting part C of the third set of switch circuit output high level, so that the second LED lamp 8 works, and the remaining LED lamps are extinguished.

(3) As shown in FIG. 3 and FIG. 4, the load connecting part A of the first set of switch circuit and the load connecting part B of the second set of switch circuit output low level, the load connecting part C of the third set of switch circuit outputs high level, so that the third LED lamp 9 works, and the remaining LED lamps are extinguished.

(4) As shown in FIG. 3 and FIG. 4, the load connecting part A of the first set of switch circuit and the load connecting part B of the second set of switch circuit output high level, the load connecting part C of the third set of switch circuit outputs low level, so that the fourth LED lamp 10 works, and the remaining LED lamps are extinguished.

Figure 5:
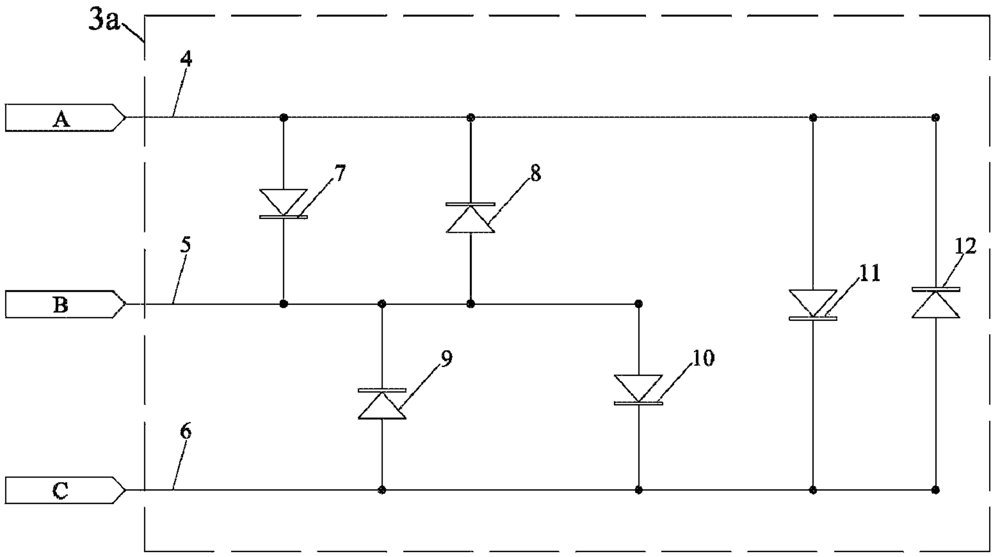
FIG. 5 is a wiring diagram of a three-wire and six-circuit lamp.

As shown in FIG. 3 and FIG. 4, the above three wires and four circuits of lamps form a three-wire and four-circuit lamp 3*a*. However, the lamp 3*a* in this embodiment is not limited to this. For example, as shown in FIG. 5, the lamp further includes a fifth LED lamp 11 and a sixth LED lamp 12, wherein an anode end of the fifth LED lamp 11 is connected to the first wire 4, and a cathode end of the fifth LED lamp 11 is connected to the third wire 6; and a cathode end of the sixth LED lamp 12 is connected to the first wire 4, and an anode end of the sixth LED lamp 12 is connected to the third wire 6. The fifth LED lamp 11 and the sixth LED lamp 12 are added based on the three-wire and four-circuit, so as to form a three-wire and six-circuit lamp.

As shown in FIG. 3 and FIG. 4, any one of the above ways can control the duty cycle and the work time of each LED lamp, and different work time may show different lighting effects. Moreover, this implementation mode is respectively connected to the controller through three wires, at least four circuits of LED lamps are also connected among the three wires, apparently, the showed lighting effect is better than that in the prior art. The controller structure and the circuit structure are simpler in a case that the circuit quantity connecting to the lamp is more than that in the prior art, so that the cost will not be increased. In addition, the two triodes in each set of switch circuit will be controlled by the microcontroller U2, so as to decide whether the level output by the switch circuit is the high level or the low level. Each triode is independently controlled, so a case that the conduction of one triode is decided by another triode in the prior art is avoided, and the control efficiency of the controller is improved.

As shown in FIG. 3, the position of the lamp controller is hard to find in an environment with low illumination. Therefore, in this embodiment, the preferred way is to further include an indicator LED 2, which is always on after being powered on, so as to indicate the position of the lamp controller. The indicator LED 2 is electrically connected to an output end of the DC power supply 1, namely, the output end V+ of the DC power supply is connected to the indicator LED 2. The indicator LED2 will keep lighting as long as the output end V+ of the DC power supply outputs the working voltage, so as to indicate the specific position of the lamp controller. In this embodiment, a nineteenth current-limiting resistor R19 is connected between the indicator LED2 and the twelfth resistor R12, and the current of the indicator LED2 is reached by reducing the nineteenth current-limiting resistor R19, thereby avoiding the damage on the indicator LED2.

As shown in FIG. 3, since a plurality of lamp flashing modes are built in the microcontroller U2, a switching signal for switching the flashing modes is sent to the microcontroller U2, and the microcontroller U2 outputs different control signals, such as the high level or the low level for controlling each set of switch circuit to be output, or the duty cycle for controlling each set of switch circuit to output the signal, so as to form different flashing modes. Certainly, the work time of the lamp 3*a* may be controlled through a selected mode, for example, working in an appointed working period, or stopping working in an appointed working period.

As shown in FIG. 3, based on the above description, this embodiment further includes a mode selector which inputs a light flashing mode switching signal or a light timing signal to the control unit 2, and the mode selector is electrically connected to the control unit. The mode selector may be controlled in a wired mode or a wireless mode. When adopting the mode selector with the wired mode, the mode selector is directly welded with the control unit 2; when adopting the mode selector with the wireless mode, a part of this mode selector is directly welded with the control unit 2, and the other part of this mode selector communicates with the control unit 2 in a form of wireless signal transmission.

As shown in FIG. 3, in this embodiment, the mode selector adopts a key switch SW or a touch switch (not shown in the figure). The key switch SW or the touch switch is electrically connected to the control unit 2, in this embodiment, one end of the key switch SW is preferentially welded with the pin 8 of the microcontroller U2, and the other end of the key switch SW is grounded.

As shown in FIG. 3, in this embodiment, a wireless signal receiver U4 is also adopted at the same time. One end of the wireless signal receiver U4 is welded with the pin 5 of the microcontroller U2, and the other end of the wireless signal receiver U4 is connected to the pin 9 of the microcontroller U2. A wireless signal transmitter paired with the wireless signal receiver U4 is not shown in the figure, the wireless signal transmitter is usually a hand-held remote control, the wireless signal transmitter communicates with the wireless signal receiver U4 through an infrared signal, and after receiving the signal sent by the wireless signal transmitter, the wireless signal receiver U4 is configured to change the flashing mode or the timing signal of the lamp 3*a*.

As shown in FIG. 3, in order to know whether the lamp 3*a* is in a timing state, this embodiment further includes a timing indicator LED1 for indicating the timing state after the control unit 2 starts the light timing according to the input of the mode selector, and the timing indicator LED1 is electrically connected to the control unit 2. The timing indicator LED1 is a light-emitting diode, one end of the timing indicator LED1 is connected to the pin 4 of the microcontroller U2, and the other end of the timing indicator LED1 is grounded through an eighteenth resistor. When the timing is started, the control unit 2 outputs a signal capable of lighting the timing indicator LED1, and when the timing is end, the control unit 2 outputs a signal capable of extinguishing the timing indicator LED1.

Figure 8:
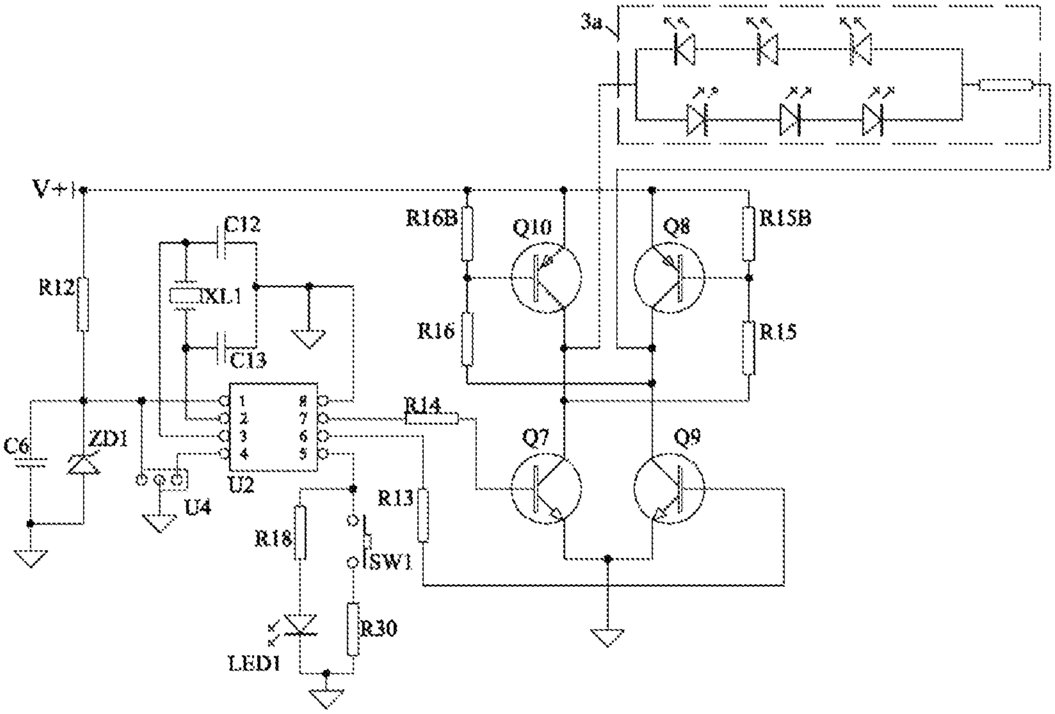
FIG. 8 is a schematic diagram of a third control unit and a switch unit.
Figure 9:
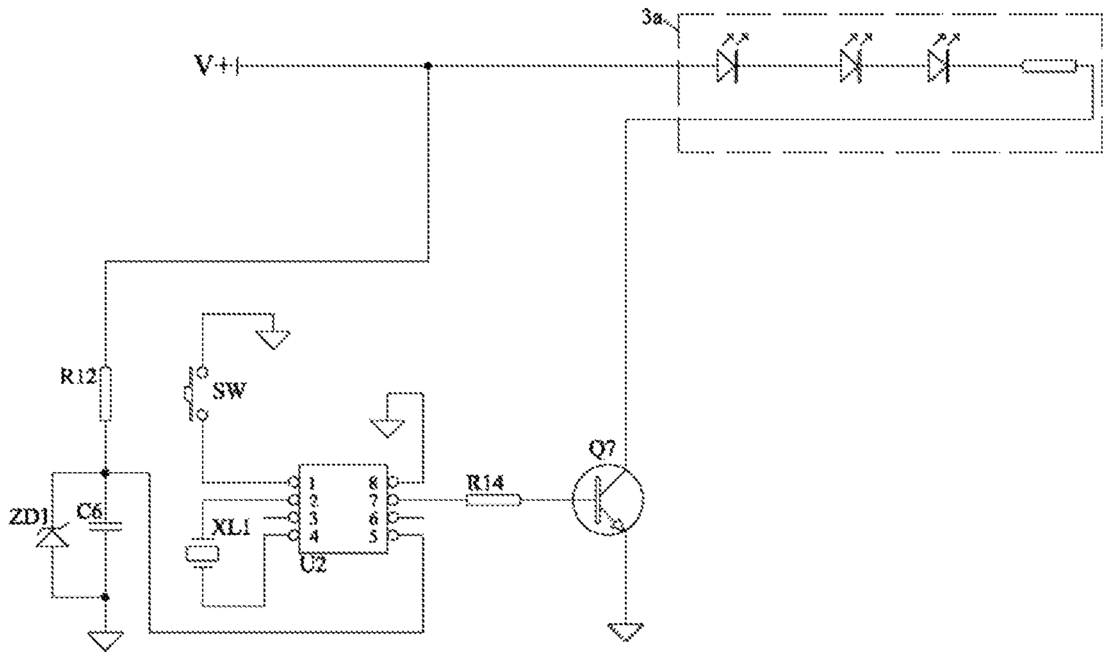
FIG. 9 is a schematic diagram of a fourth control unit and a switch unit.
Figure 10:
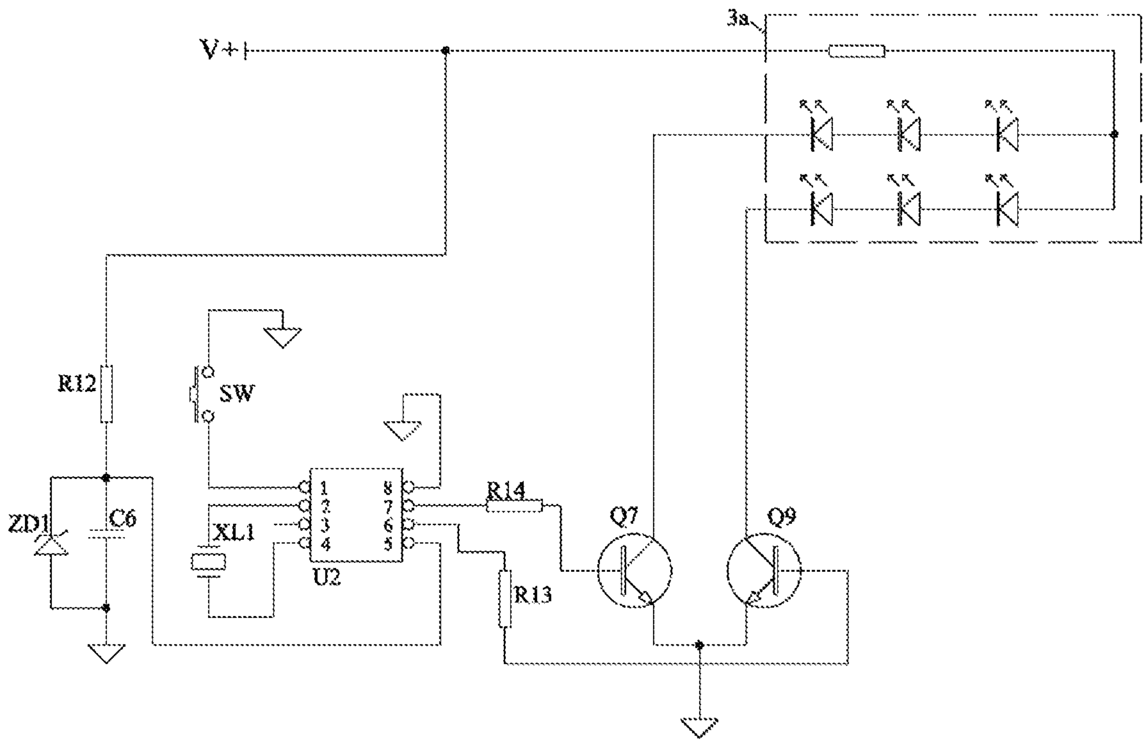
FIG. 10 is a schematic diagram of a fifth control unit and a switch unit.
Figure 11A:
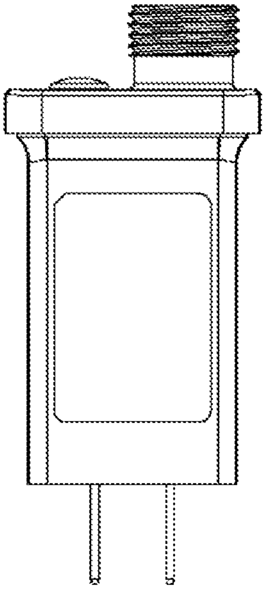
FIG. 11*a* to FIG. 11*g* are respectively orthographic views and solid diagrams of six surfaces of an appearance of a first lamp controller.
Figure 11B:
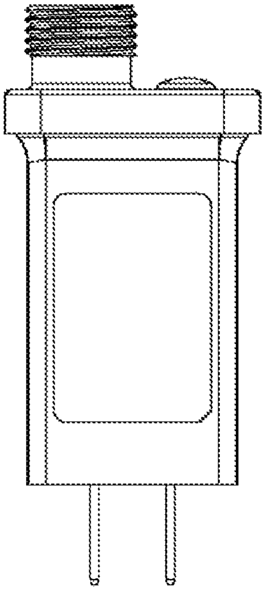
Figure 11E:
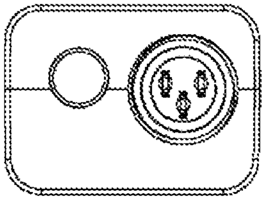
Figure 11F:
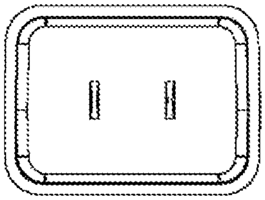
Figure 11C:
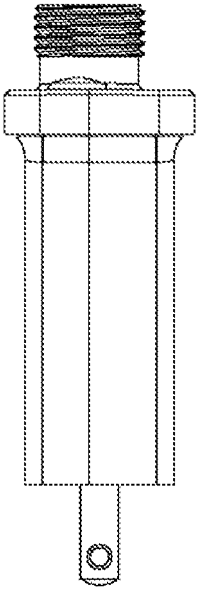
Figure 11D:
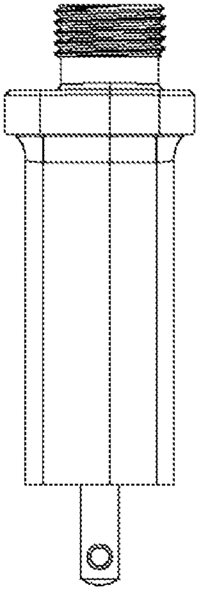
Figure 11G:
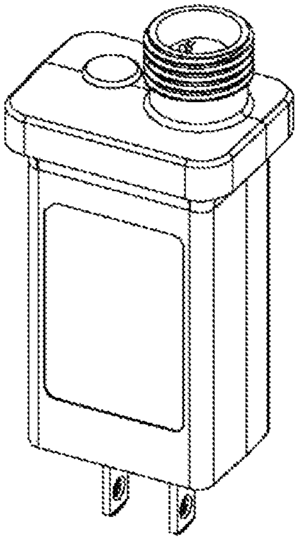
Figure 12A:
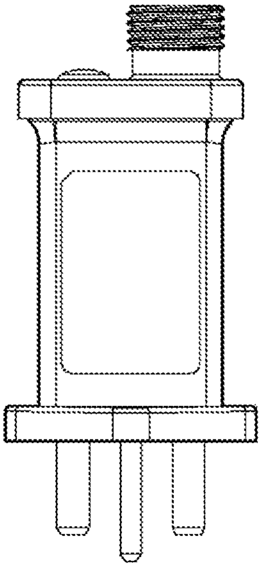
FIG. 12*a* to FIG. 12*g* are respectively orthographic views and solid diagrams of six surfaces of an appearance of a second lamp controller.
Figure 12B:
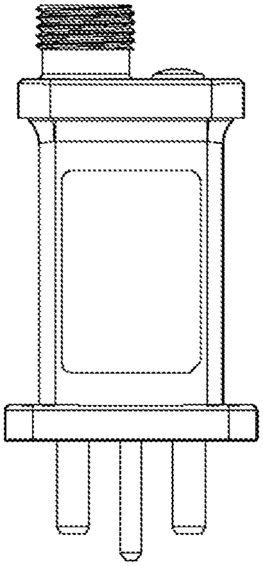
Figure 12E:
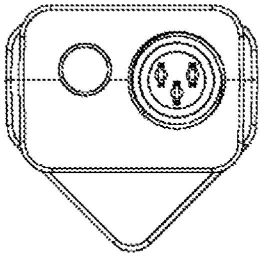
Figure 12F:
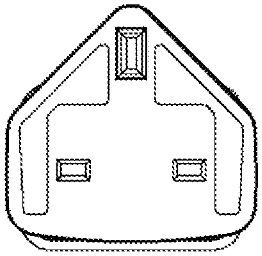
Figure 12C:
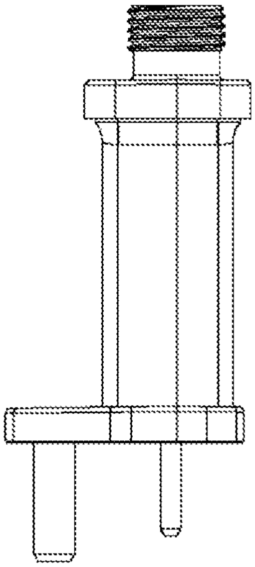
Figure 12D:
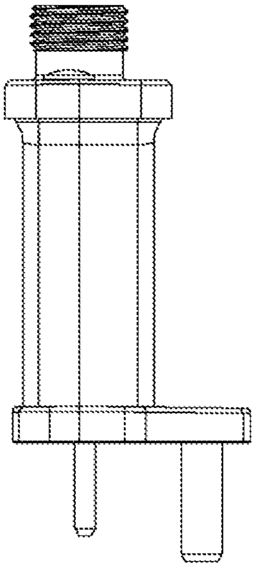
Figure 12G:
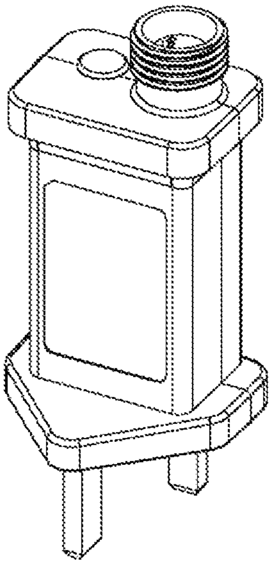
Figure 13A:
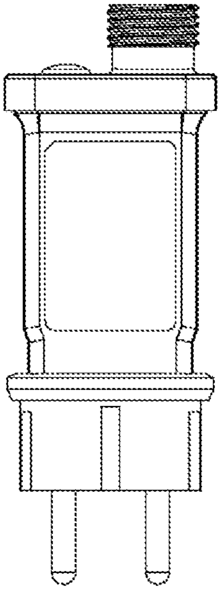
FIG. 13*a* to FIG. 13*g* are respectively orthographic views and solid diagrams of six surfaces of an appearance of a third lamp controller.
Figure 13B:
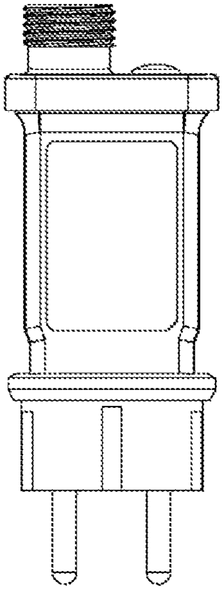
Figure 13E:
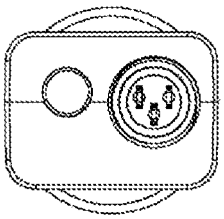
Figure 13F:
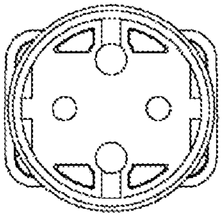
Figure 13C:
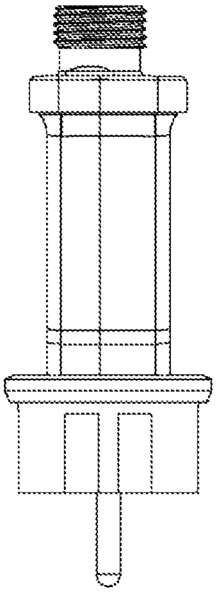
Figure 13D:
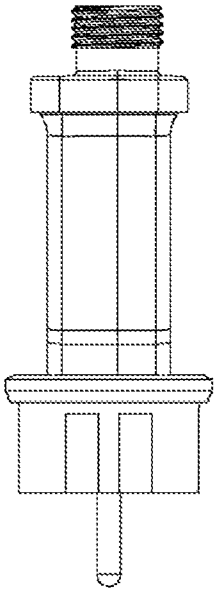
Figure 13G:
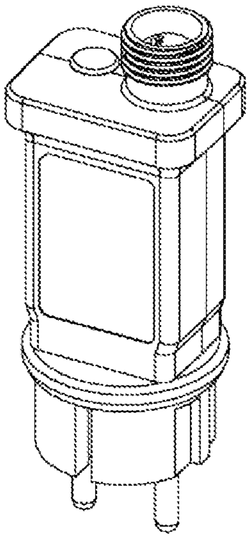
Figure 14A:
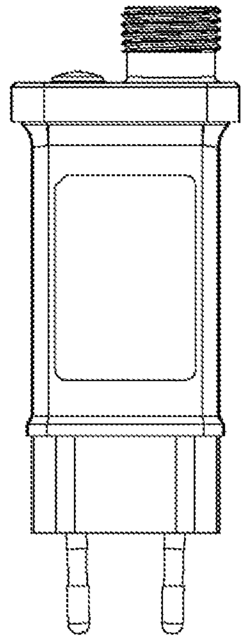
FIG. 14*a* to FIG. 14*g* are respectively orthographic views and solid diagrams of six surfaces of an appearance of a fourth lamp controller.
Figure 14B:
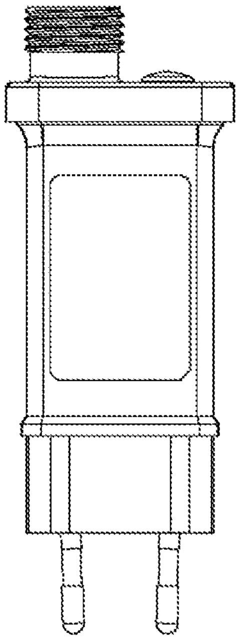
Figure 14E:
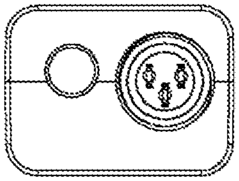
Figure 14F:
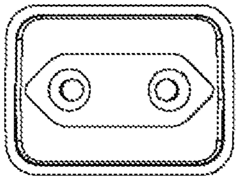
Figure 14C:
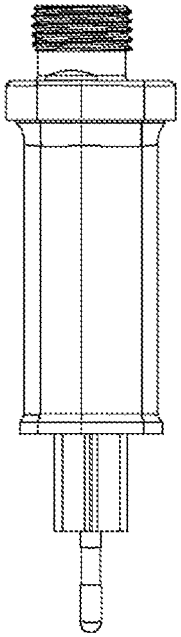
Figure 14D:
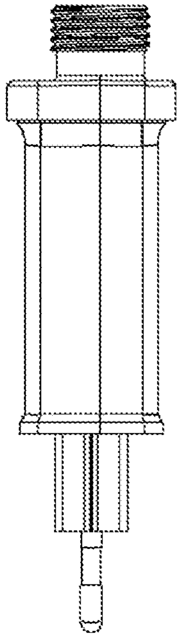
Figure 14G:
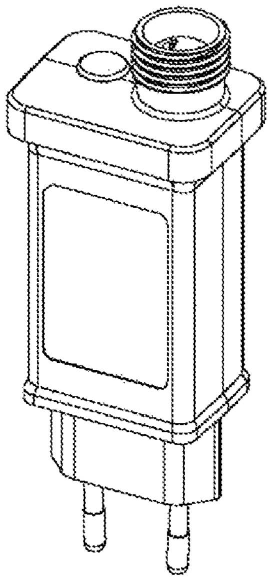
Figure 15A:
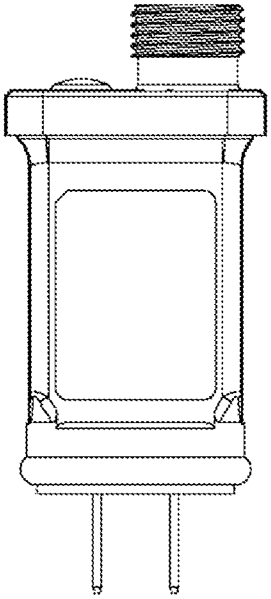
FIG. 15*a* to FIG. 15*g* are respectively orthographic views and solid diagrams of six surfaces of an appearance of a fifth lamp controller.
Figure 15B:
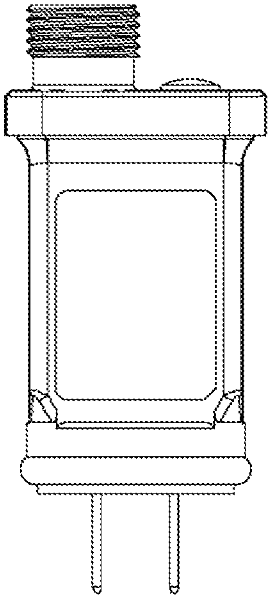
Figure 15E:
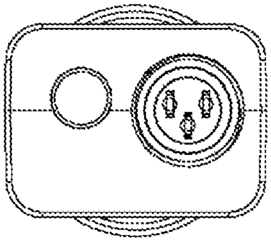
Figure 15F:
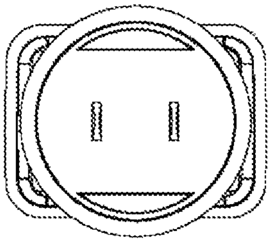
Figure 15C:
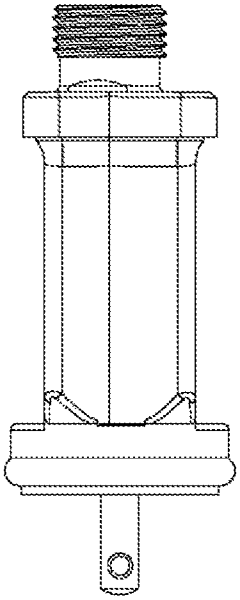
Figure 15D:
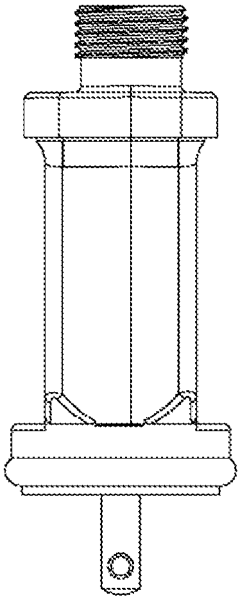
Figure 15G:
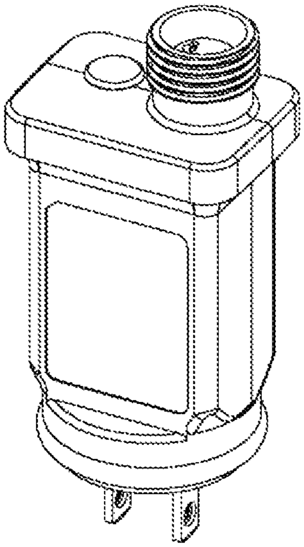
Figure 16A:
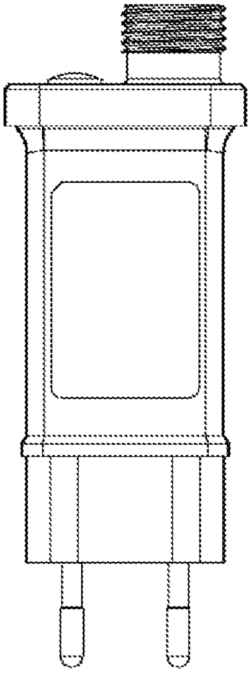
FIG. 16*a* to FIG. 16*g* are respectively orthographic views and solid diagrams of six surfaces of an appearance of a sixth lamp controller.
Figure 16B:
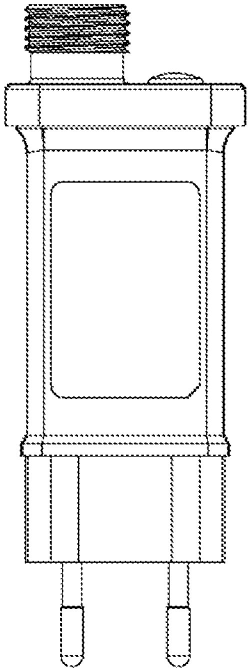
Figure 16E:
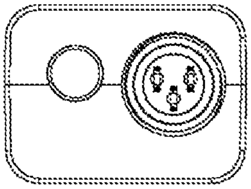
Figure 16F:
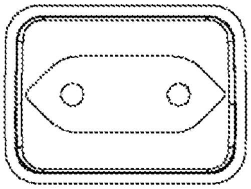
Figure 16C:
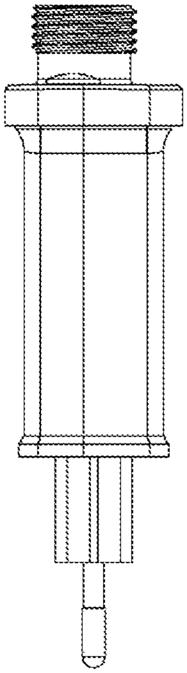
Figure 16D:
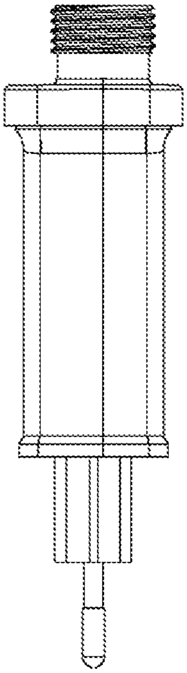
Figure 16G:
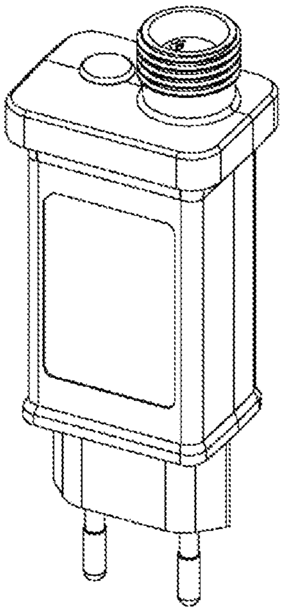
Figure 17A:
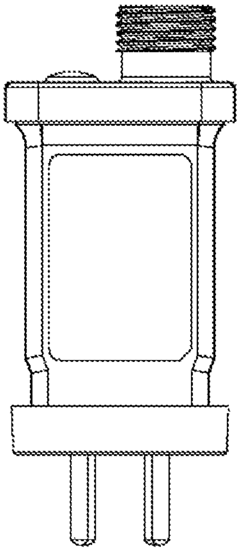
FIG. 17*a* to FIG. 17*g* are respectively orthographic views and solid diagrams of six surfaces of an appearance of a seventh lamp controller.
Figure 17B:
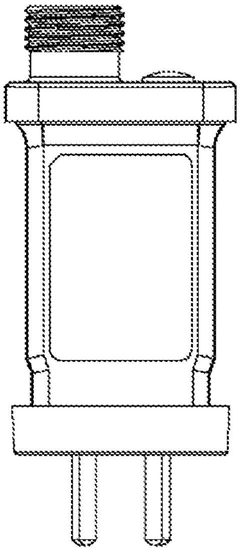
Figure 17E:
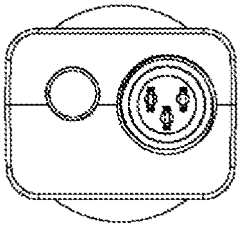
Figure 17F:
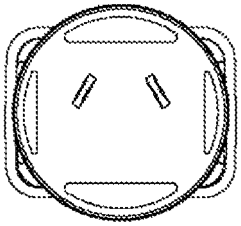
Figure 17C:
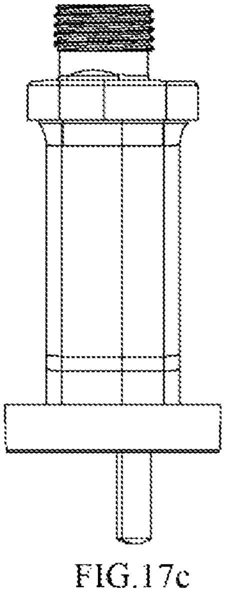
Figure 17D:
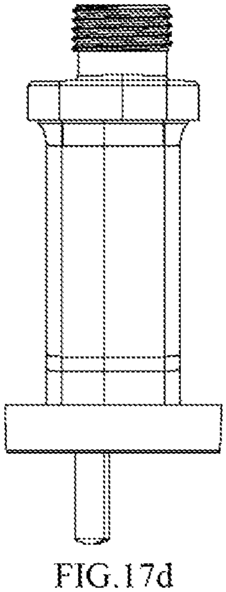
Figure 17G:
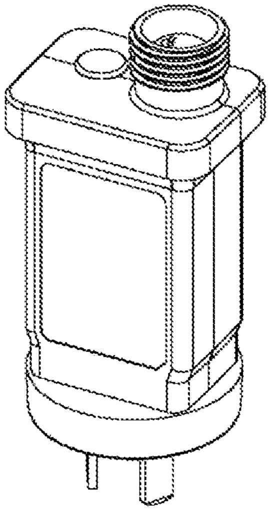
Figure 18A:
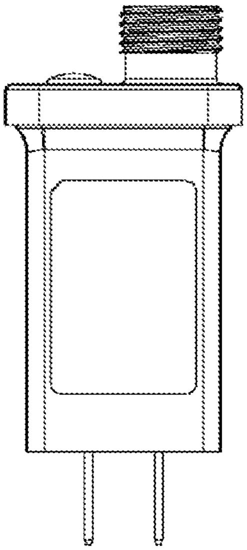
FIG. 18*a* to FIG. 18*g* are respectively orthographic views and solid diagrams of six surfaces of an appearance of an eighth lamp controller.
Figure 18B:
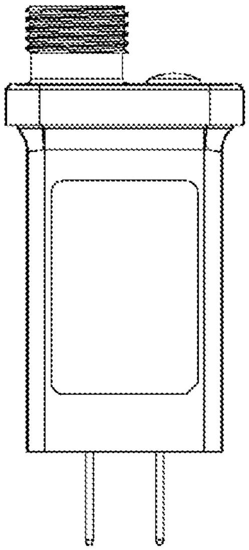
Figure 18E:
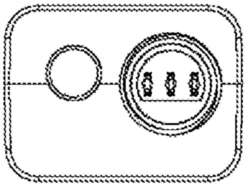
Figure 18F:
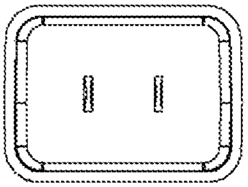
Figure 18C:
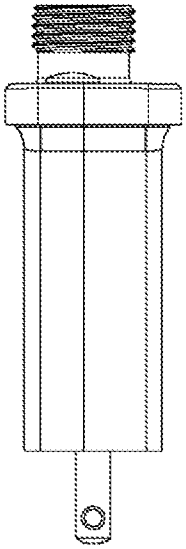
Figure 18D:
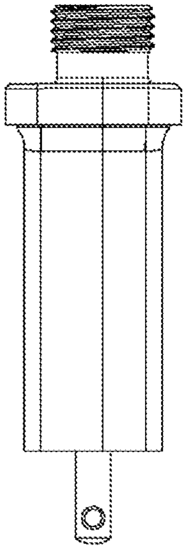
Figure 18G:
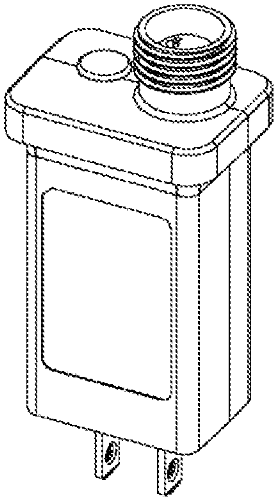
Figure 19A:
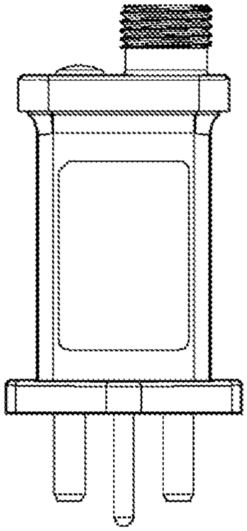
FIG. 19*a* to FIG. 19*g* are respectively orthographic views and solid diagrams of six surfaces of an appearance of a ninth lamp controller.
Figure 19B:
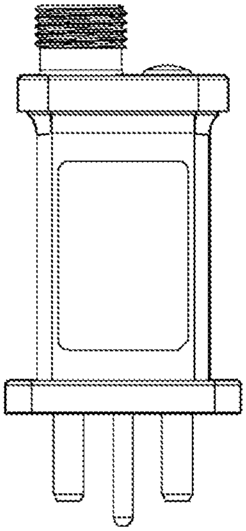
Figure 19E:
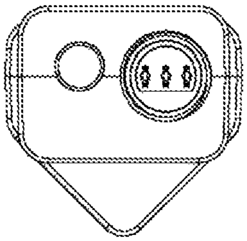
Figure 19F:
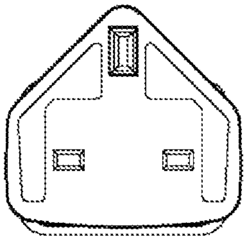
Figure 19C:
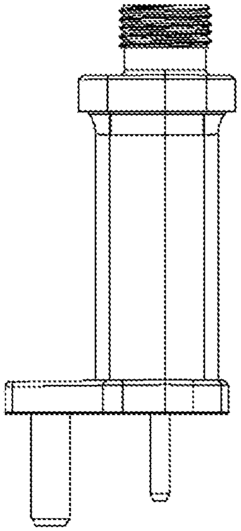
Figure 19D:
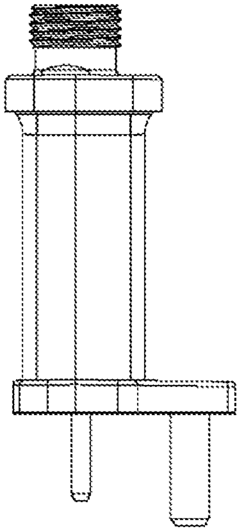
Figure 19G:
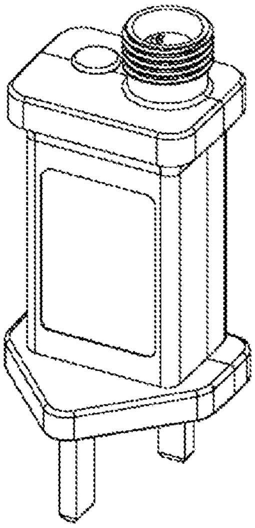
Figure 20A:
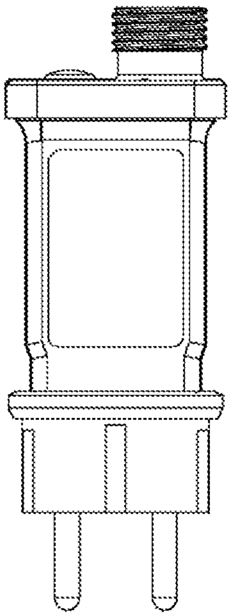
FIG. 20*a* to FIG. 20*g* are respectively orthographic views and solid diagrams of six surfaces of an appearance of a tenth lamp controller.
Figure 20B:
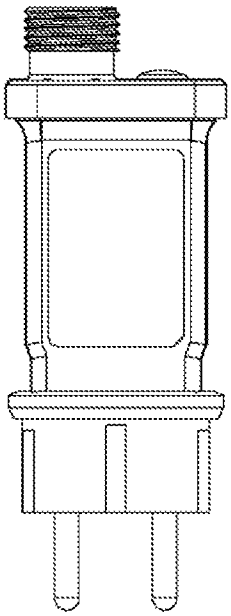
Figure 20E:
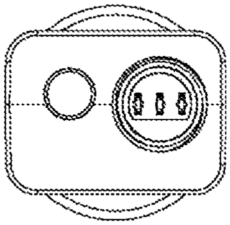
Figure 20F:
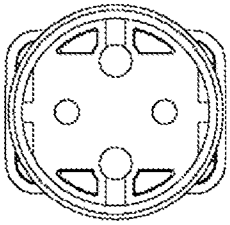
Figure 20C:
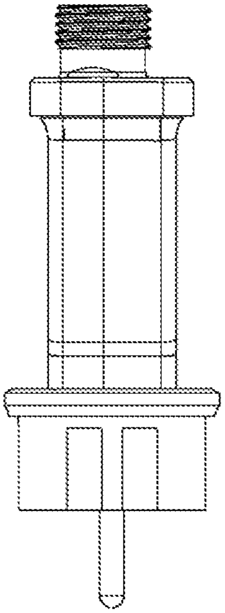
Figure 20D:
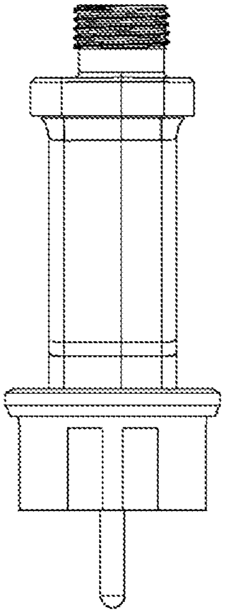
Figure 20G:
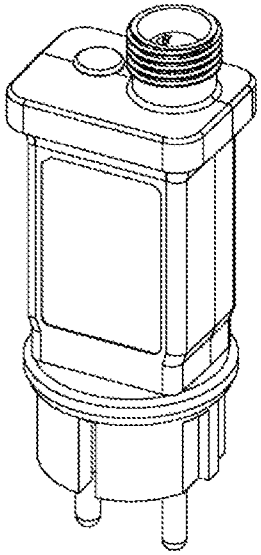
Figure 21A:
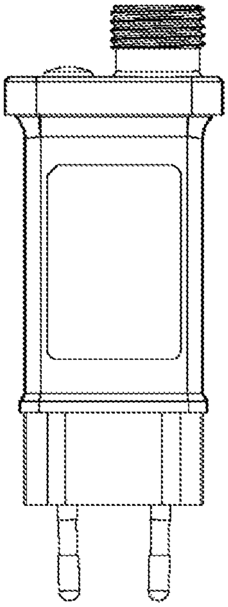
FIG. 21*a* to FIG. 21*g* are respectively orthographic views and solid diagrams of six surfaces of an appearance of an eleventh lamp controller.
Figure 21B:
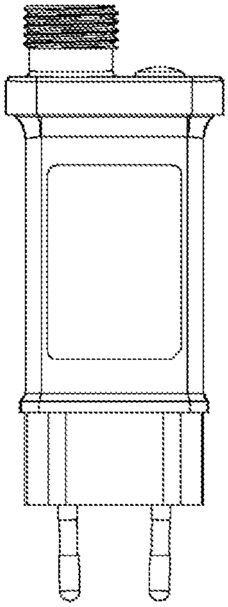
Figure 21E:
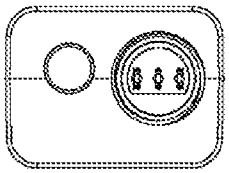
Figure 21F:
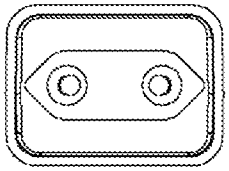
Figure 21C:
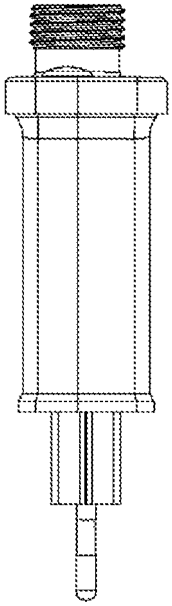
Figure 21D:
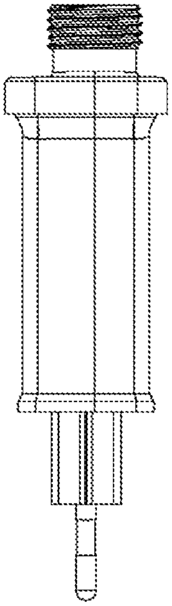
Figure 21G:
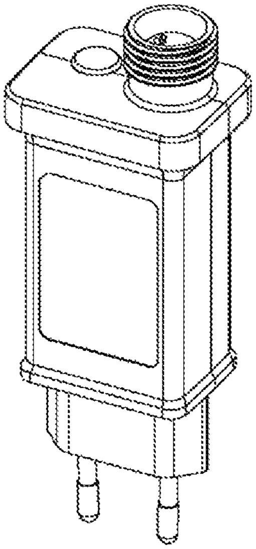
Figure 22A:
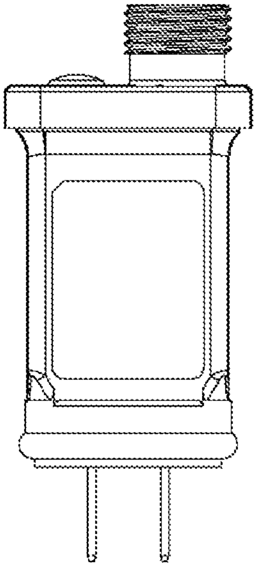
FIG. 22*a* to FIG. 22*g* are respectively orthographic views and solid diagrams of six surfaces of an appearance of a twelfth lamp controller.
Figure 22B:
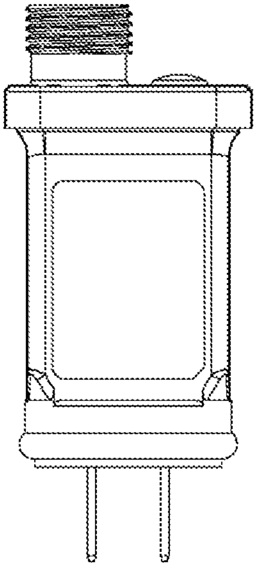
Figure 22E:
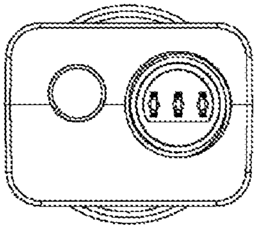
Figure 22F:
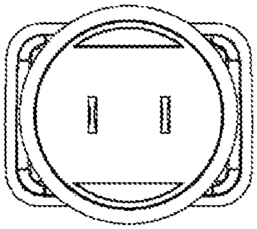
Figure 22C:
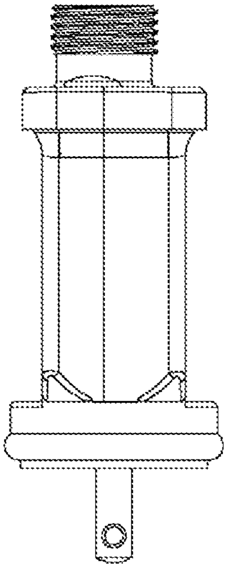
Figure 22D:
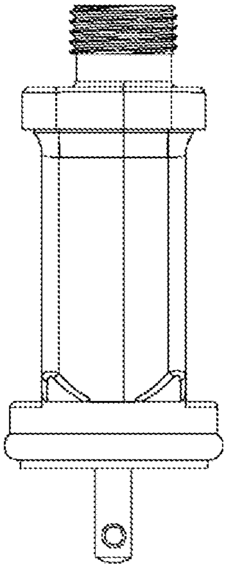
Figure 22G:
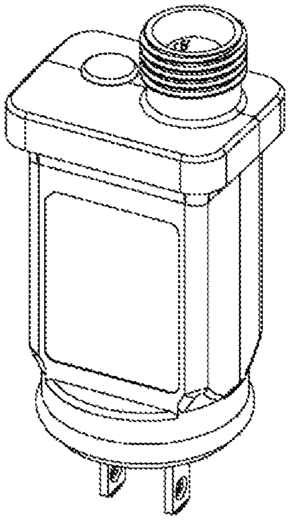
Figure 23A:
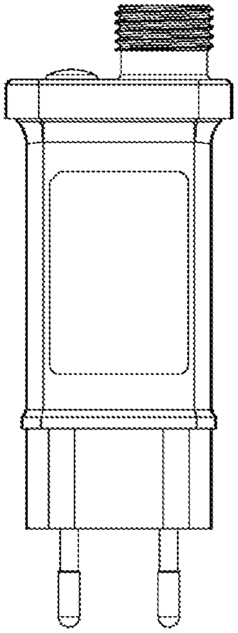
FIG. 23*a* to FIG. 23*g* are respectively orthographic views and solid diagrams of six surfaces of an appearance of a thirteenth lamp controller.
Figure 23B:
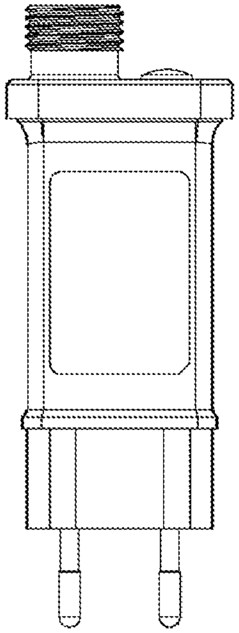
Figure 23E:
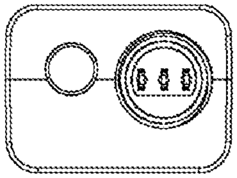
Figure 23F:
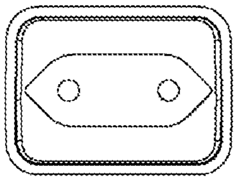
Figure 23C:
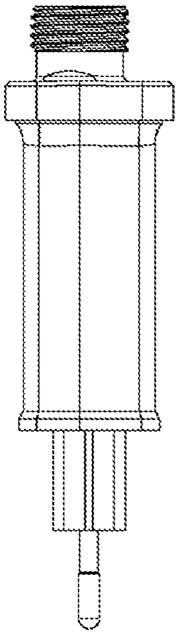
Figure 23D:
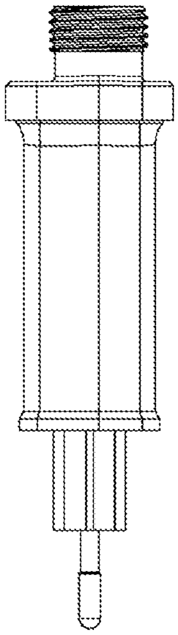
Figure 23G:
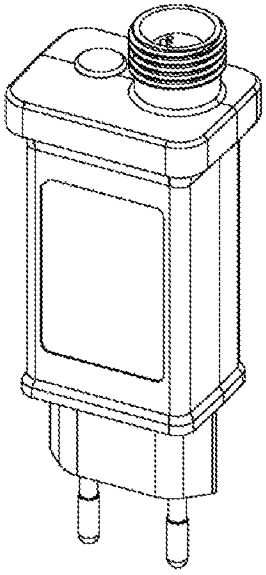
Figure 24A:
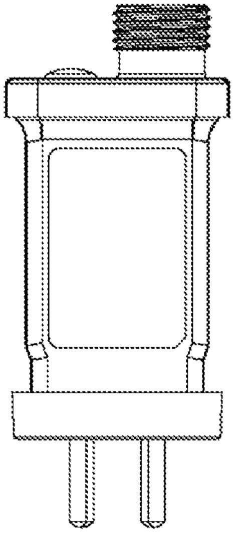
FIG. 24*a* to FIG. 24*g* are respectively orthographic views and solid diagrams of six surfaces of an appearance of a fourteenth lamp controller.
Figure 24B:
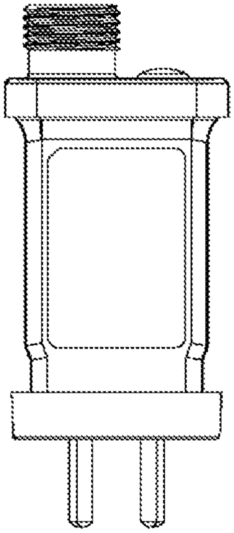
Figure 24E:
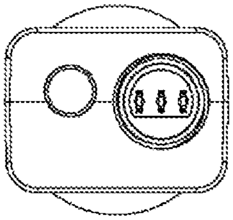
Figure 24F:
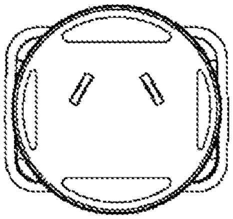
Figure 24C:
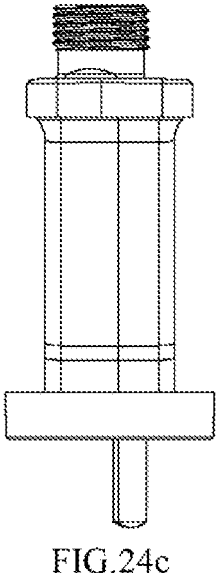
Figure 24D:
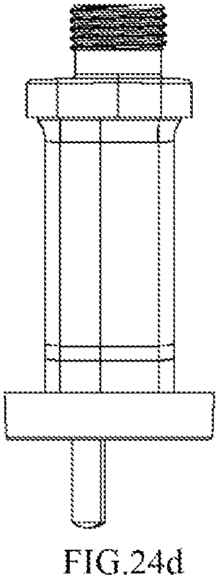
Figure 24G:
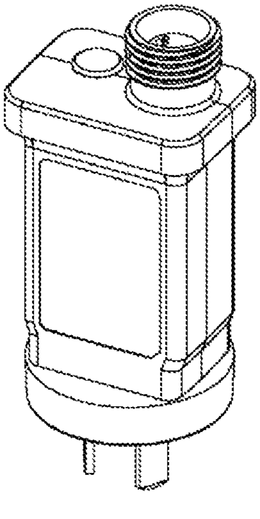
Figure 25A:
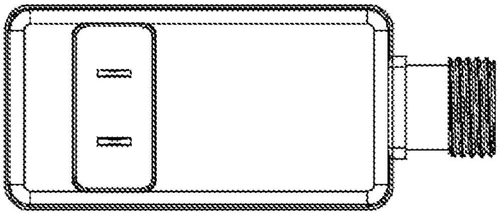
FIG. 25*a* to FIG. 25*f* are respectively orthographic views of six surfaces of an appearance of a fifteenth lamp controller.
Figure 25B:
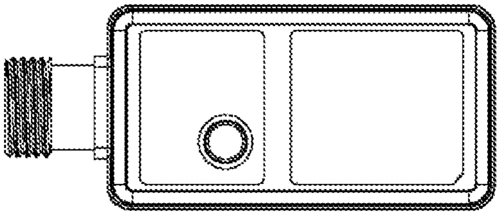
Figure 25C:
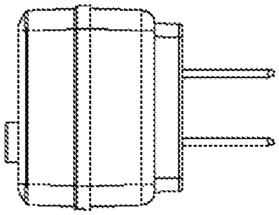
Figure 25D:
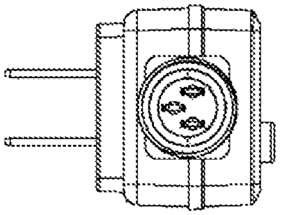
Figure 25E:
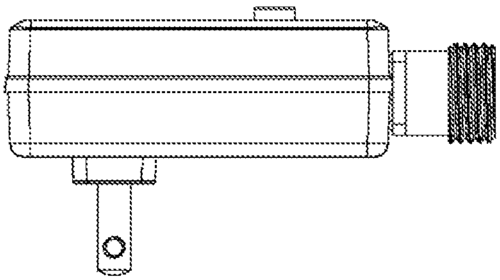
Figure 25F:
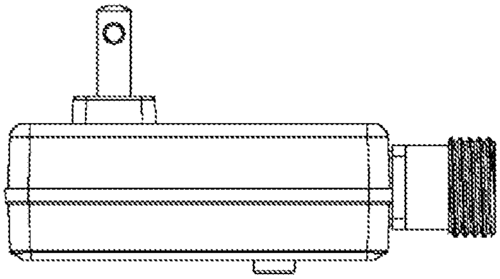
Figure 26A:
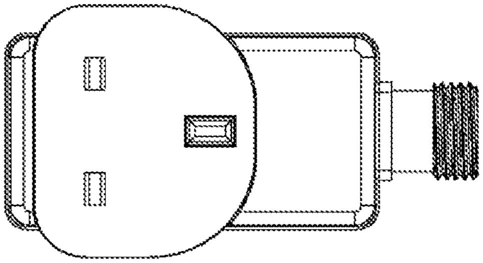
FIG. 26*a* to FIG. 26*f* are respectively orthographic views of six surfaces of an appearance of a sixteenth lamp controller.
Figure 26B:
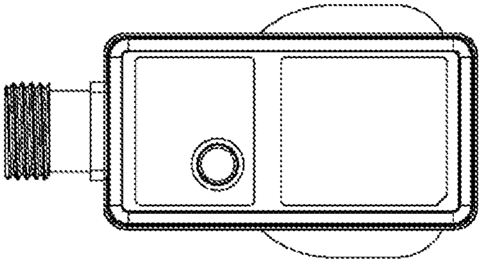
Figure 26C:
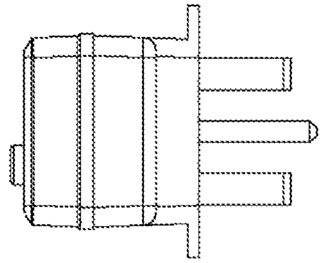
Figure 26D:
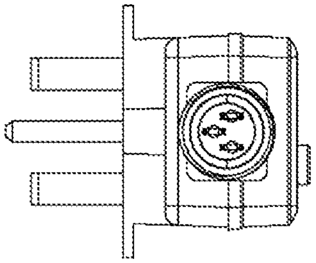
Figure 26E:
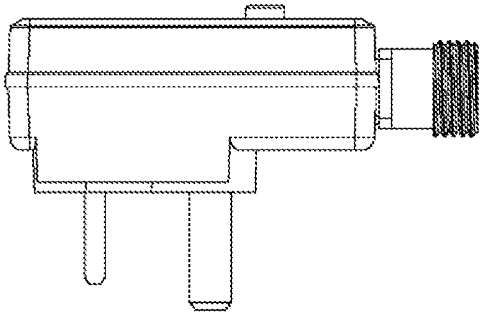
Figure 26F:
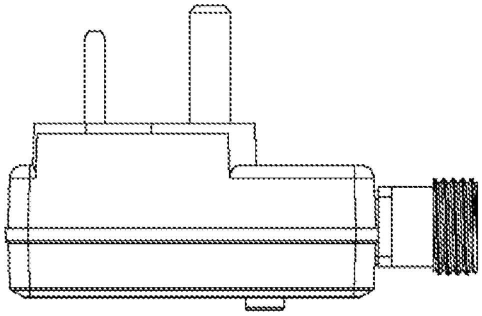
Figure 27A:
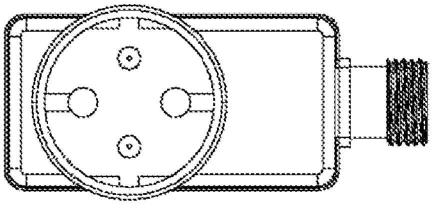
FIG. 27*a* to FIG. 27*f* are respectively orthographic views of six surfaces of an appearance of a seventeenth lamp controller.
Figure 27B:
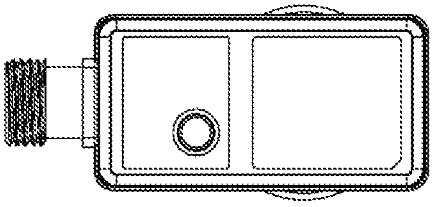
Figure 27C:
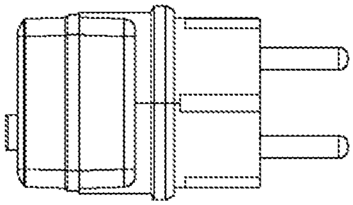
Figure 27D:
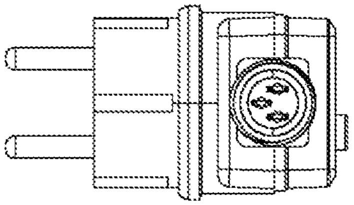
Figure 27E:
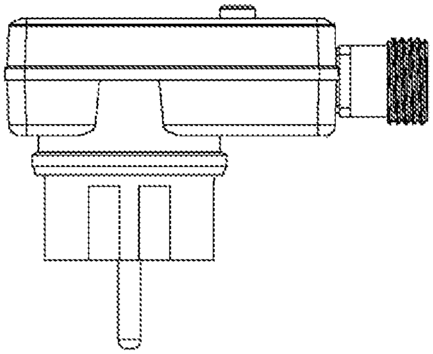
Figure 27F:
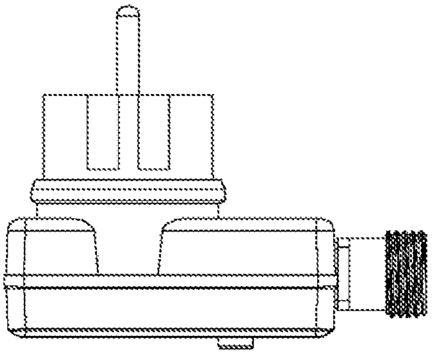
Figure 28A:
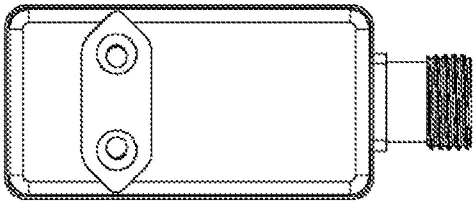
FIG. 28*a* to FIG. 28*f* are respectively orthographic views of six surfaces of an appearance of an eighteenth lamp controller.
Figure 28B:
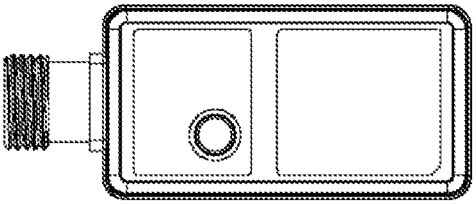
Figure 28C:
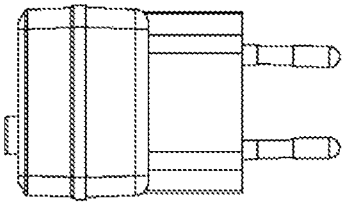
Figure 28D:
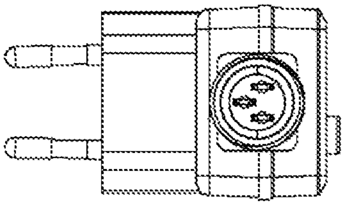
Figure 28E:
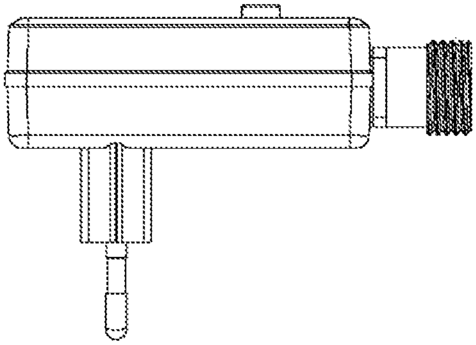
Figure 28F:
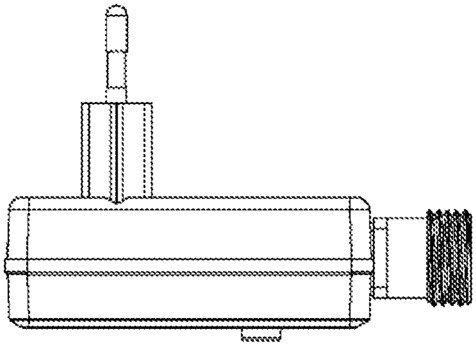
Figure 29A:
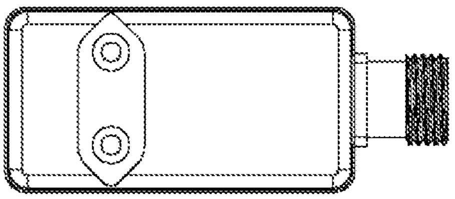
FIG. 29*a* to FIG. 29*f* are respectively orthographic views of six surfaces of an appearance of a nineteenth lamp controller.
Figure 29B:
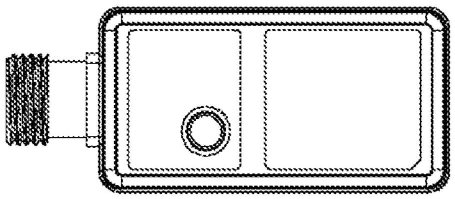
Figure 29C:
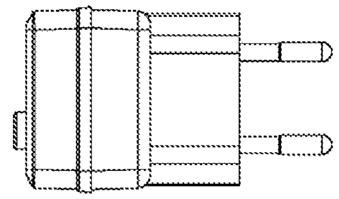
Figure 29D:
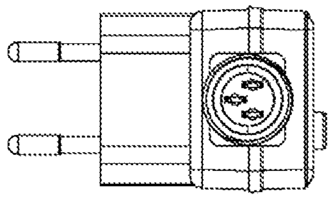
Figure 29E:
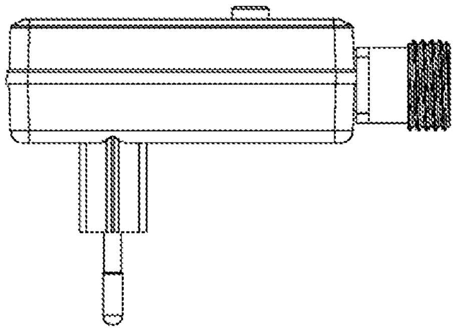
Figure 29F:
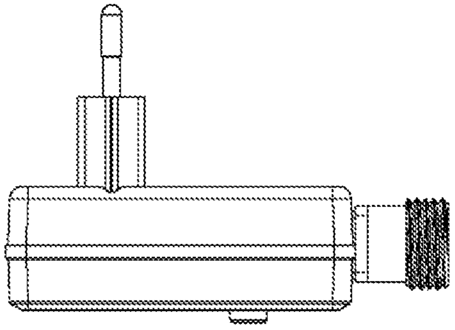
Figure 30A:
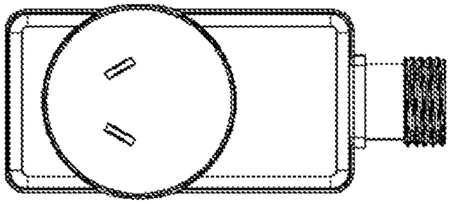
Figure 30B:
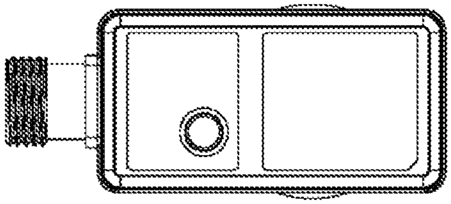
Figure 30C:
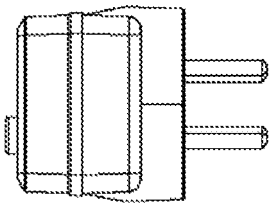
Figure 30D:
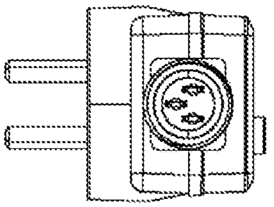
Figure 30E:
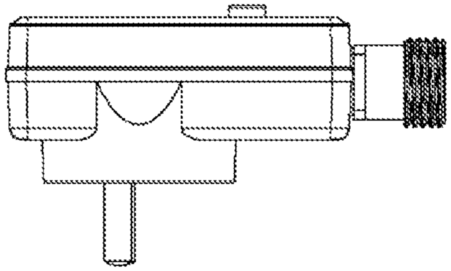
Figure 30F:
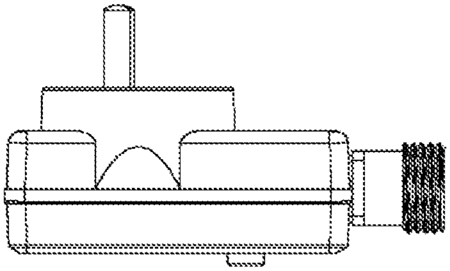
Figure 31A:
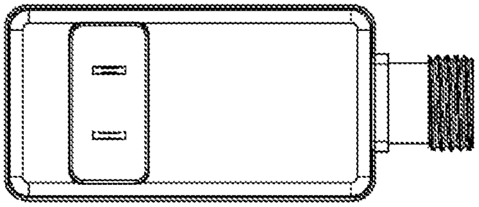
Figure 31B:
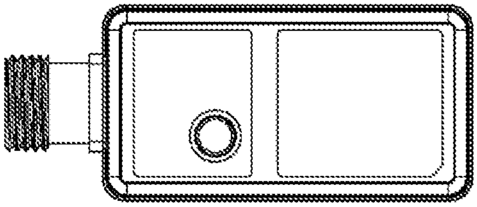
Figure 31C:
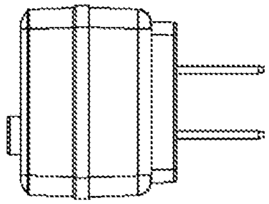
Figure 31D:
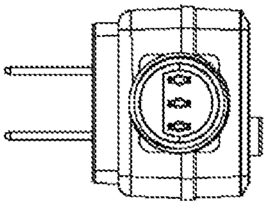
Figure 31E:
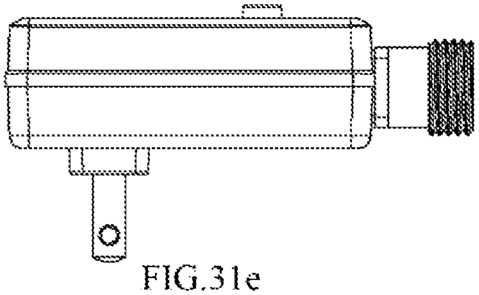
Figure 31F:
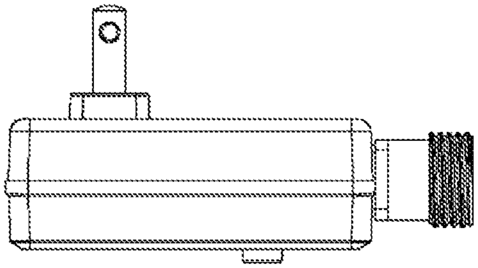
Figure 32A:
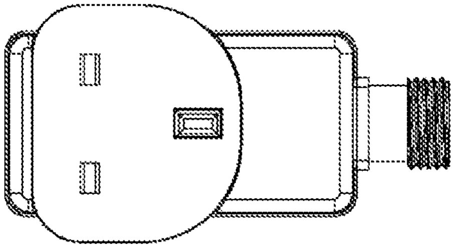
FIG. 32*a* to FIG. 32*f* are respectively orthographic views of six surfaces of an appearance of a twenty-second lamp controller.
Figure 32B:
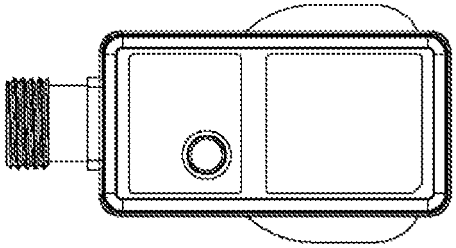
Figure 32C:
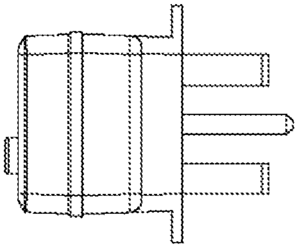
Figure 32D:
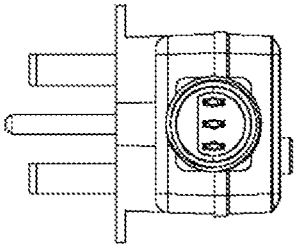
Figure 32E:
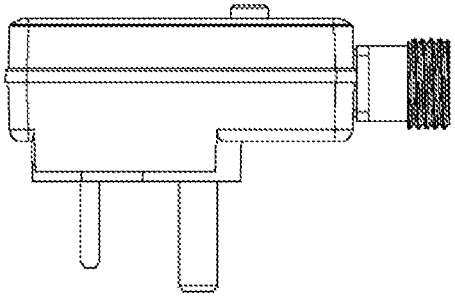
Figure 32F:
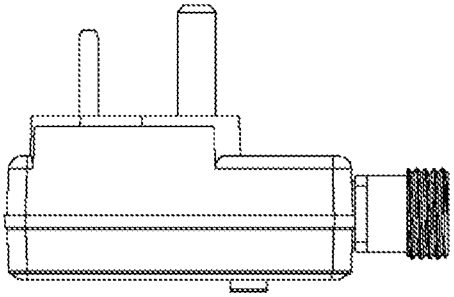
Figure 33A:
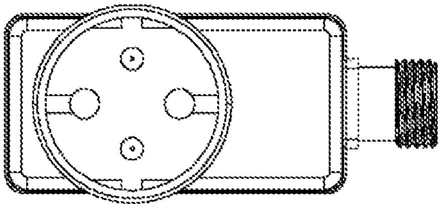
FIG. 33*a* to FIG. 33*f* are respectively orthographic views of six surfaces of an appearance of a twenty-third lamp controller.
Figure 33B:
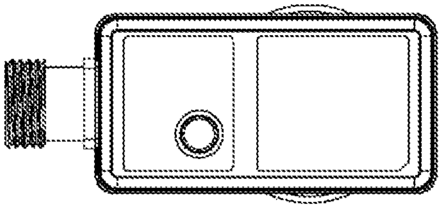
Figure 33C:
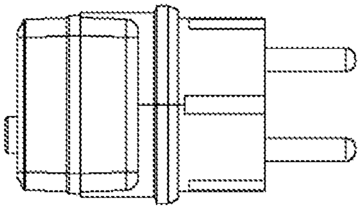
Figure 33D:
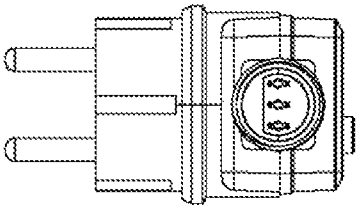
Figure 33E:
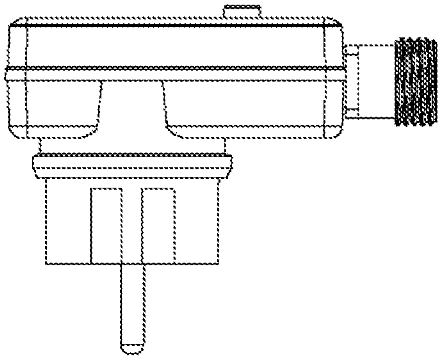
Figure 33F:
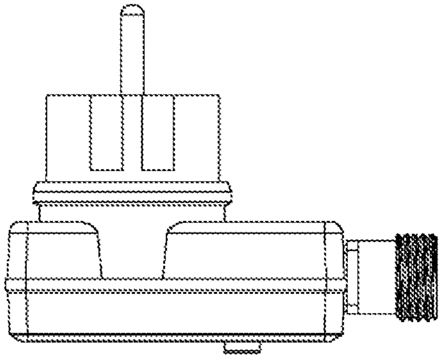
Figure 34A:
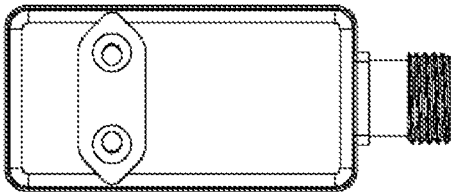
FIG. 34*a* to FIG. 34*f* are respectively orthographic views of six surfaces of an appearance of a twenty-fourth lamp controller.
Figure 34B:
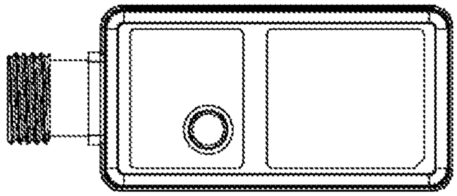
Figure 34C:
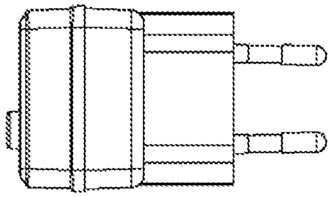
Figure 34D:
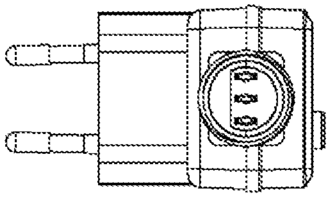
Figure 34E:
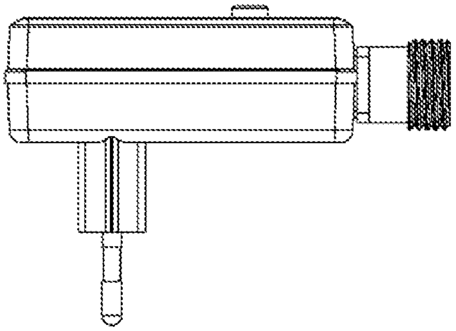
Figure 34F:
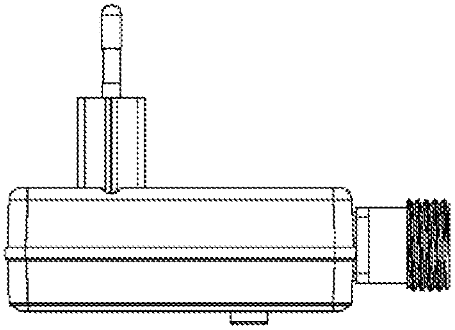
Figure 35A:
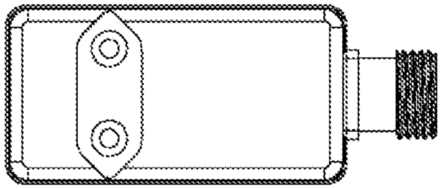
FIG. 35*a* to FIG. 35*f* are respectively orthographic views of six surfaces of an appearance of a twenty-fifth lamp controller.
Figure 35B:
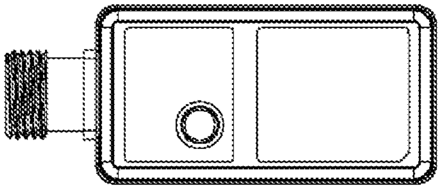
Figure 35C:
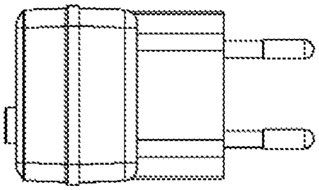
Figure 35D:
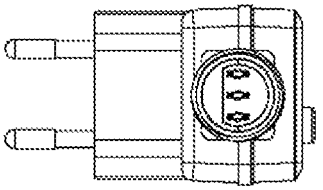
Figure 35E:
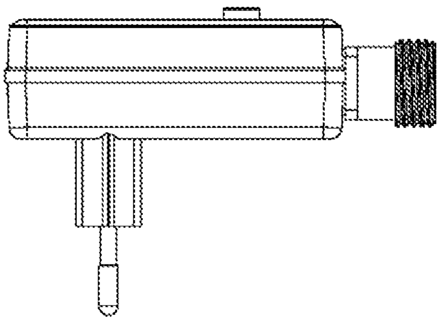
Figure 35F:
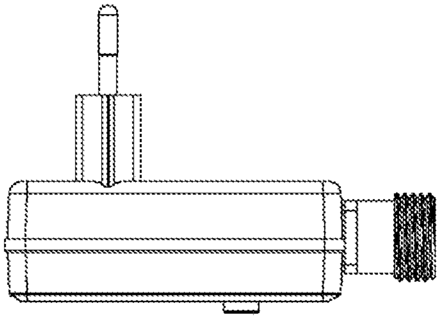
Figure 36A:
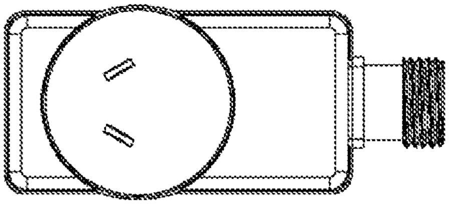
FIG. 36*a* to FIG. 36*f* are respectively orthographic views of six surfaces of an appearance of a twenty-sixth lamp controller.
Figure 36B:
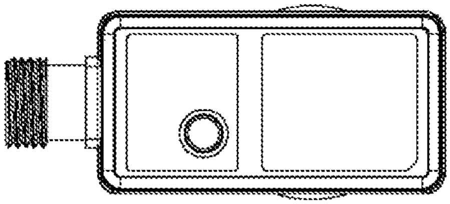
Figure 36C:
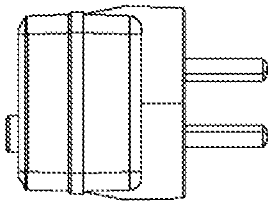
Figure 36D:
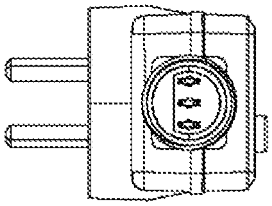
Figure 36E:
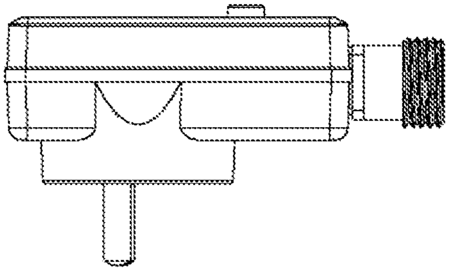
Figure 36F:
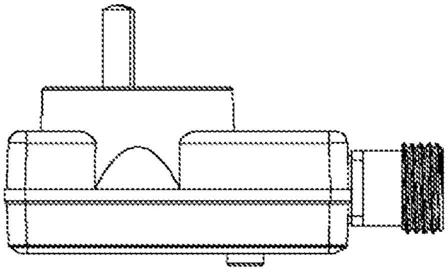
Figure 37A:
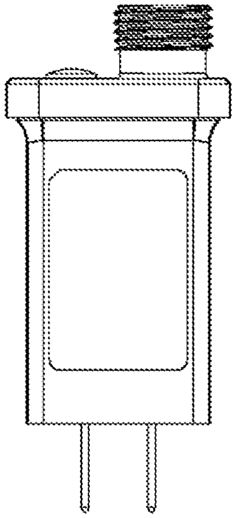
FIG. 37*a* to FIG. 37*f* are respectively orthographic views of six surfaces of an appearance of a twenty-seventh lamp controller.
Figure 37B:
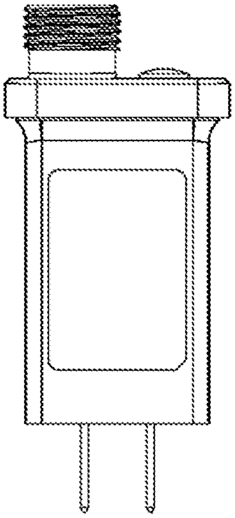
Figure 37E:
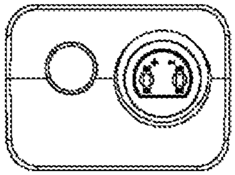
Figure 37C:
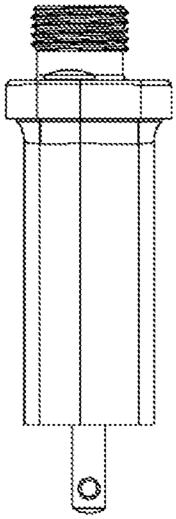
Figure 37D:
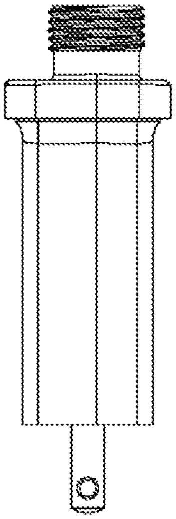
Figure 37F:
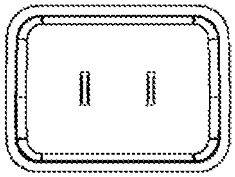
Figure 38A:
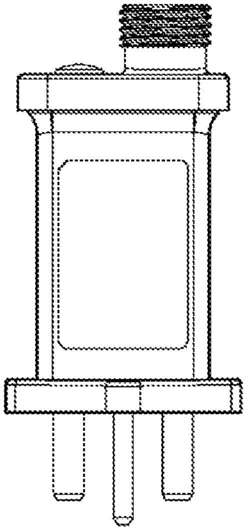
FIG. 38*a* to FIG. 38*f* are respectively orthographic views of six surfaces of an appearance of a twenty-eighth lamp controller.
Figure 38B:
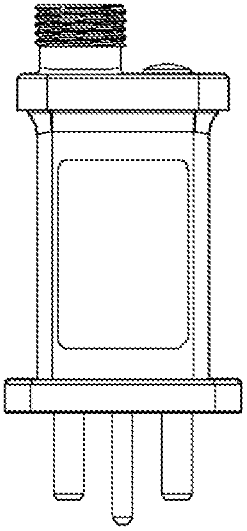
Figure 38E:
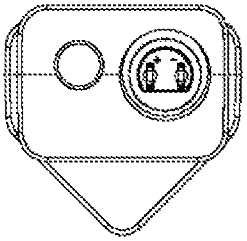
Figure 38C:
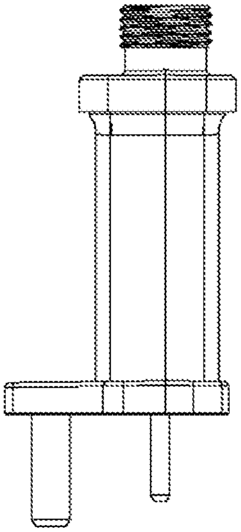
Figure 38D:
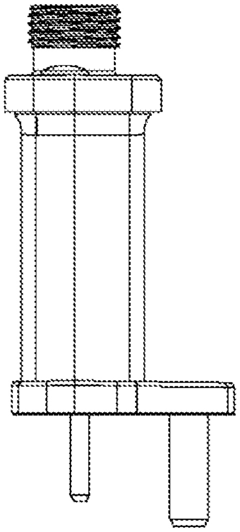
Figure 38F:
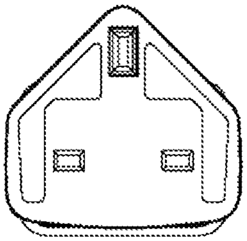
Figure 39A:
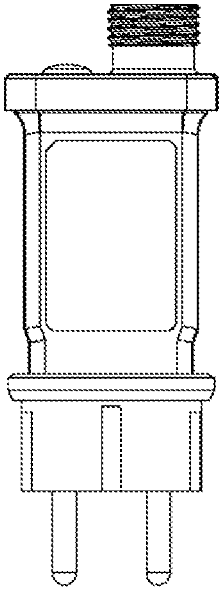
FIG. 39*a* to FIG. 39*f* are respectively orthographic views of six surfaces of an appearance of a twenty-ninth lamp controller.
Figure 39B:
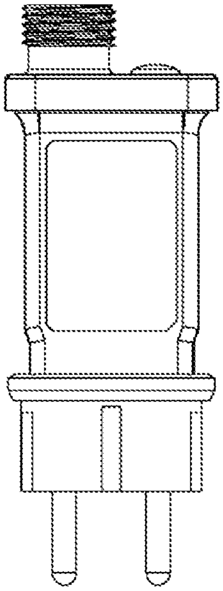
Figure 39E:
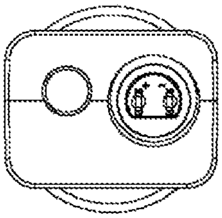
Figure 39C:
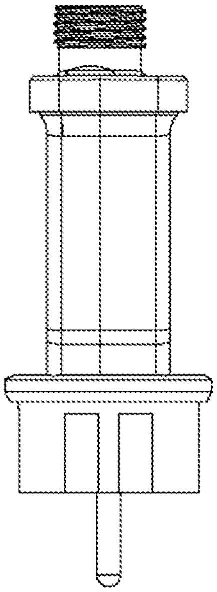
Figure 39D:
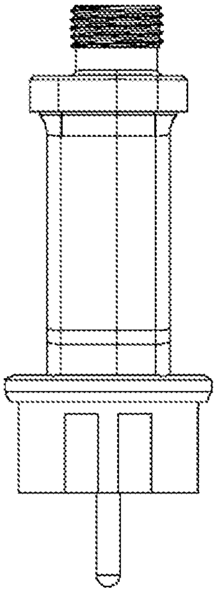
Figure 39F:
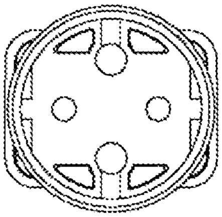
Figure 40A:
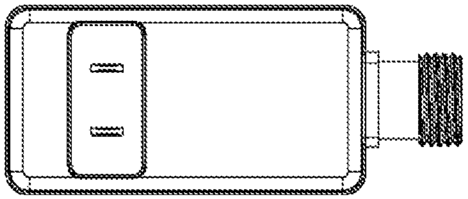
FIG. 40*a* to FIG. 40*f* are respectively orthographic views of six surfaces of an appearance of a thirtieth lamp controller.
Figure 40B:
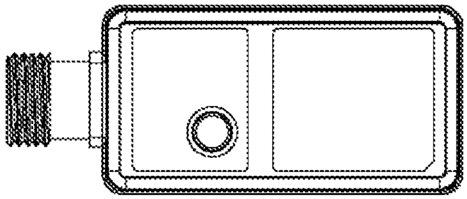
Figure 40C:
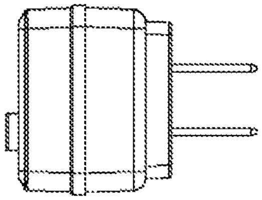
Figure 40D:
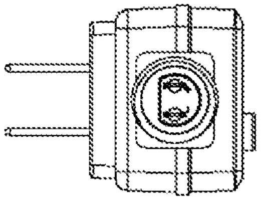
Figure 40E:
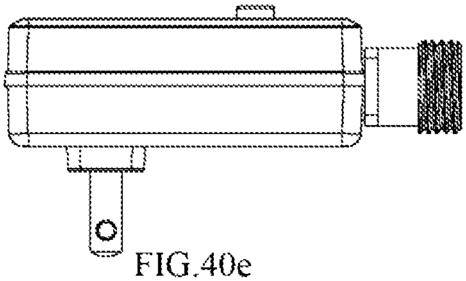
Figure 40F:
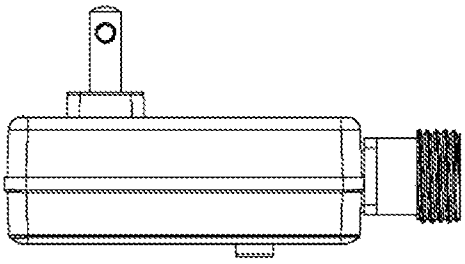
Figure 41A:
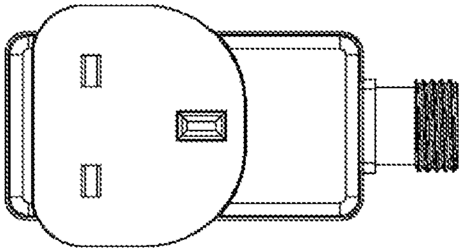
FIG. 41*a* to FIG. 41*f* are respectively orthographic views of six surfaces of an appearance of a thirty-first lamp controller.
Figure 41B:
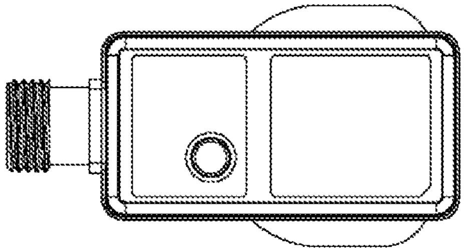
Figure 41C:
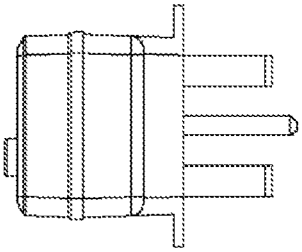
Figure 41D:
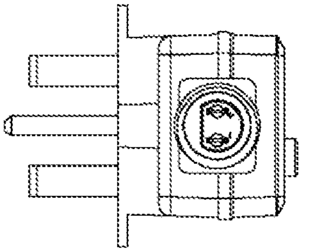
Figure 41E:
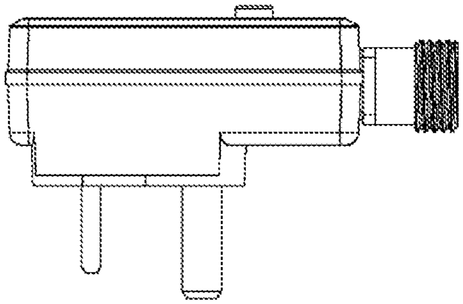
Figure 41F:
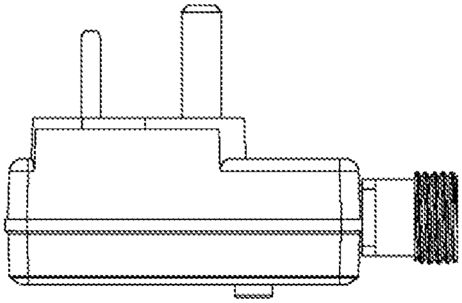
Figure 42A:
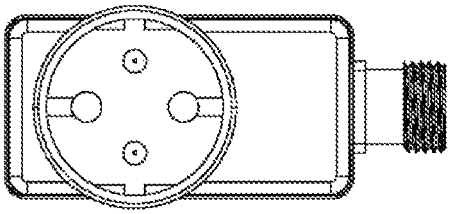
FIG. 42*a* to FIG. 42*f* are respectively orthographic views of six surfaces of an appearance of a thirty-second lamp controller.
Figure 42B:
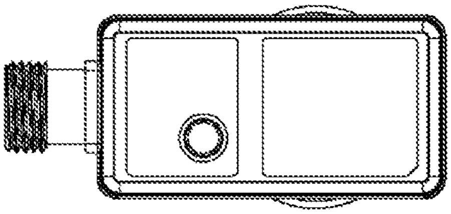
Figure 42C:
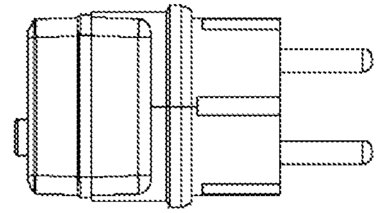
Figure 42D:
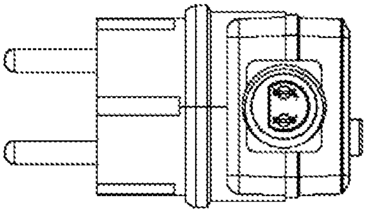
Figure 42E:
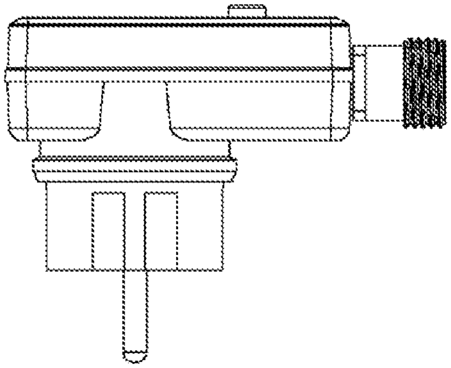
Figure 42F:
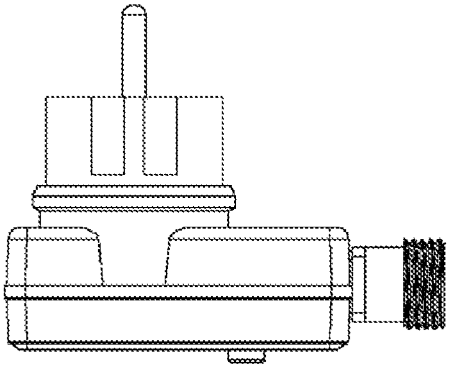

In addition to connect to the three-wire and four-circuit lamp 3*a* in FIG. 4, the switch unit 2 in the embodiment 1 may also be connected to the three-wire and six-circuit lamp 3*a* in FIG. 5. In addition, the lamp luster shown in FIG. 4 and FIG. 5 may be connected to any one of FIG. 11*a* to FIG. 36*f* in actual use. FIG. 8 to FIG. 10 are any one control unit and switch unit in FIG. 37*a* to FIG. 42*f*.

Embodiment 2

Figure 6:
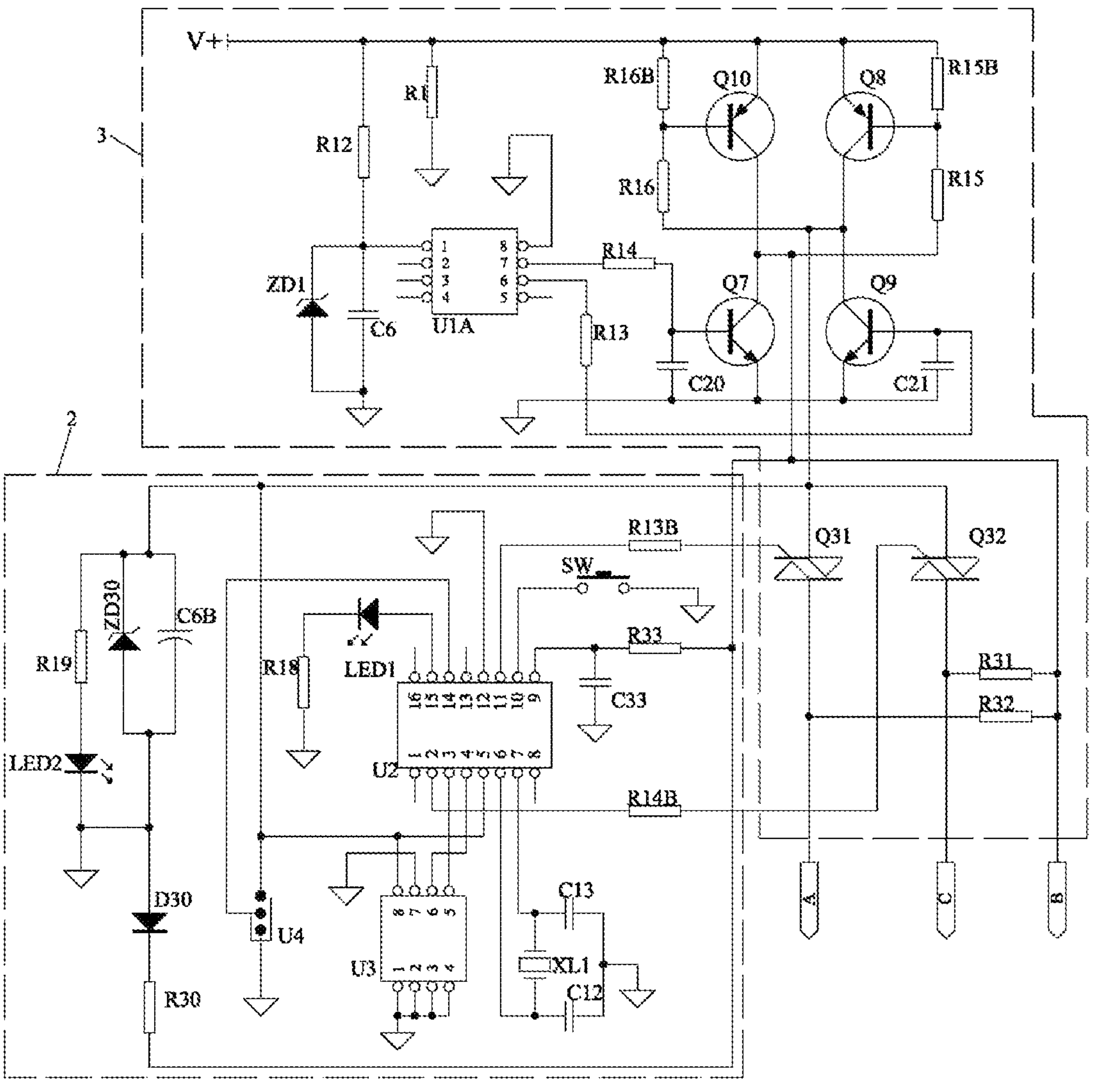
FIG. 6 is a schematic diagram of a second control unit and a switch unit in the present disclosure.

As shown in FIG. 6, in this lamp controller, the structure of the DC power supply 1 is the same as the DC power supply in the embodiment 1, therefore the structures of the second control unit 2 and the switch unit 3 in the present disclosure are not repeated herein.

The output end V+ of the DC power supply 1 is electrically connected to the switch unit 3, and the switch unit 3 includes a first switch set, a second switch set and a control module U1A for controlling the first switch set and the second switch set to be turned on alternately. An output end of the control module U1A is electrically connected to the first switch set, and the output end of the control module U1A forms a second set of switch circuit after being electrically connected to the second switch set.

The difference between this embodiment and the embodiment 1 is that the voltage-stabilizing filter circuit is arranged between the output end V+ of the DC power supply and the control module U1A, namely, one end of the twelfth resistor R12 in the voltage-stabilizing filter circuit is connected to the output end V+ of the DC power supply, the other end of the twelfth resistor R12 is connected to the cathode end of the voltage-stabilizing diode ZD1, the anode end of the voltage-stabilizing diode ZD1 is grounded, one end of the sixth capacitor C6 is connected to the cathode end of the voltage-stabilizing diode ZD1, the other end of the sixth capacitor C6 is grounded, and the pin 1 of the microcontroller U2 is connected to one end of the sixth capacitor C6.

In this embodiment, the second switch set includes a ninth triode Q9 and a tenth triode Q10, a base electrode of the ninth triode Q9 is connected to the output end of the control module U1A, the control module U1A is a chip, the base electrode of the ninth triode Q9 is connected to the pin 6 of the control module U1A through a thirteenth resistor R13, the base electrode of the ninth triode Q9 is also connected to one end of a twenty-first capacitor C21, the other end of the twenty-first capacitor C21 is grounded, an emitting electrode of the ninth triode Q9 is grounded, a collecting electrode of the ninth triode Q9 is respectively connected to a base electrode of the tenth triode Q10 and the output end of the DC power supply 1, a sixteenth resistor R16 is connected between the ninth triode Q9 and the output end V+ of the DC power supply 1, a sixteenth current-limiting resistor R16B is connected between the base electrode of the tenth triode Q10 and the output end V+ of the DC power supply 1, an emitting electrode of the tenth triode Q10 is connected to the output end V+ of the DC power supply 1, and the collecting electrode of the tenth triode Q10 is the output end of the second set of switch circuit. Based on the above structure, a deformed or replaced solution is that the ninth triode Q9 and the tenth triode Q10 may be replaced by the MOS tube.

The working process of the second set of switch circuit is as follows: when the pin 6 of the control module U1A outputs high level, the high level is provided to the ninth triode Q9 after being subjected to current-limiting through the thirteenth resistor R13, so as to trigger the ninth triode Q9. Since the collecting electrode of the ninth triode Q9 is connected to the output end V+ of the DC power supply 1 through the sixteenth resistor R16, the ninth triode Q9 is turned on after the base electrode of the ninth triode Q9 is triggered. The emitting electrode of the ninth triode Q9 is grounded, so the collecting electrode of the ninth triode Q9 is lowered to the low level after the ninth triode Q9 is turned on, however the base electrode of the tenth triode Q10 is connected to the collecting electrode of the ninth triode Q9 and the emitting electrode of the tenth triode Q10 is connected to the output end V+ of the DC power supply 1, so when the base electrode of the tenth triode Q10 is the low level, the tenth triode Q10 is turned on, and then the collecting electrode of the tenth triode Q10 outputs high level, namely, the output end of the second set of switch circuit outputs high level.

When the pin 6 of the control module U1A outputs low level, the ninth triode Q9 and the tenth triode Q10 are in a cut-off state, namely, the output end of the second set of switch circuit outputs low level.

The first switch set includes a seventh triode Q7 and an eighth triode Q8, a base electrode of the seventh triode Q7 is connected to the output end of the control module U1A, the base electrode of the seventh triode Q7 is connected to the pin 7 of the control module U1A through a fourteenth resistor R14, the base electrode of the seventh triode Q7 is also connected to one end of the twenty-first capacitor C21, the other end of the twenty-first capacitor C21 is grounded, an emitting electrode of the seventh triode Q7 is grounded, a collecting electrode of the seventh triode Q7 is respectively connected to a base electrode of the eighth triode Q8 and the output end of the DC power supply 1, a fifteenth resistor R15 is connected between the seventh triode Q7 and the output end V+ of the DC power supply 1, a fifteenth current-limiting resistor R16B is connected between the base electrode of the eighth triode Q8 and the output end V+ of the DC power supply 1, an emitting electrode of the eighth triode Q8 is connected to the output end V+ of the DC power supply 1, and a collecting electrode of the eighth triode Q8 is electrically connected to a first toggle switch Q31 and a second toggle switch Q32 in respective. Based on the above structure, a deformed or replaced solution is that the seventh triode Q7 and the eighth triode Q8 may be replaced by the MOS tube.

The working process of the second set of switch circuit is as follows: when the pin 7 of the control module U1A outputs high level, the high level is provided to the seventh triode Q7 after being subjected to current-limiting through the fourteenth resistor R14, so as to trigger the seventh triode Q7. Since the collecting electrode of the seventh triode Q7 is connected to the output end V+ of the DC power supply 1 through the fifteenth resistor R15, the seventh triode Q7 is turned on after the base electrode of the seventh triode Q7 is triggered. The emitting electrode of the seventh triode Q7 is grounded, so the collecting electrode of the seventh triode Q7 is lowered to the low level after the seventh triode Q7 is turned on, however the base electrode of the eighth triode Q8 is connected to the collecting electrode of the seventh triode Q7 and the emitting electrode of the eighth triode Q8 is connected to the output end V+ of the DC power supply 1, so when the base electrode of the eighth triode Q8 is the low level, the eighth triode Q8 is turned on, and then the collecting electrode of the eighth triode Q8 outputs high level, namely, the output end of the first set of switch circuit outputs high level.

When the pin 7 of the control module U1A outputs low level, the seventh triode Q7 and the eighth triode Q8 are in a cut-off state, namely, the output end of the first set of switch circuit outputs low level.

The pins 6 and 7 of the control module U1A output high level and low level alternately, so the first set of switch circuit and the second set of switch circuit output high level and low level alternately.

The lamp controller further includes a control unit 2, and in this embodiment, the structure of the control unit 2 is the same as that of the embodiment 1, so the control unit 2 is not repeated herein.

The control unit 2 is electrically connected to the switch unit 3, the switch unit 3 further includes a first toggle switch Q31 and a second toggle switch Q32, the first toggle switch Q31 forms the first set of switch circuit after being electrically connected to the output end of the first switch set and the control unit 2 in respective, and the second toggle switch Q32 forms the third set of switch circuit after being electrically connected to the output end of the first switch set and the control unit 2 in respective. In this embodiment, the first toggle switch Q31 and the second toggle switch Q32 are thyristors, wherein the pin 11 of the microcontroller U2 of the control unit 2 is connected to a gate electrode of the first toggle switch Q31 through the thirteenth current-limiting resistor R13B, and the pin 2 of the microcontroller U2 is connected to a gate electrode of the second toggle switch Q32 through the fourteenth current-limiting resistor R14B.

The control unit 2 is configured to provide a trigger signal to the first toggle switch Q31 and the second toggle switch Q32, when the output end of the first switch set outputs high level, the first toggle switch Q31 or the second toggle switch Q32 is controlled to be turned on through the control unit 2, and when the output end of the first switch set outputs low level, the first toggle switch Q31 or the second toggle switch Q32 is turned off.

For the above structure, the output end of the first toggle switch Q31 is the load connecting part A, the output end of the second set of switch circuit is the load connecting part B, the output end of the second toggle switch Q32 is the load connecting part C, the load connecting parts A, B and C are respectively connected to the lamps 3*a* shown in FIG. 4 or FIG. 5, so as to control the lighting of each circuit of lamp luster. The specific conduction principle for controlling each circuit of lamp luster is the same as the embodiment 1, so it will not be repeated herein.

The switch unit 3 in the embodiment 2 can output higher voltage, for example, a circuit of namely, the output ends of the first set of switch and the second set of switch can output therefore a thirty-first current-limiting resistor R31 is connected between the output end of the second toggle switch Q32 and the output end of the second set of switch circuit, a thirty-second current-limiting resistor R32 is connected between the output end of the first toggle switch Q31 and the output end of the second set of switch circuit, the current is reduced through the current-limiting resistor, thereby avoiding damage on the lamp 3*a* connected later.

This embodiment further includes a power supply circuit which supplies power to the control unit 2, the output end of the first switch set is also connected to the power supply circuit, and the power supply circuit is electrically connected to the control unit 2. Namely, this embodiment does not adopt the way preferentially that the DC power supply 1 supplies power to the control unit 2, and supplies power to the control unit 2 in an indirect way. In this embodiment, when the output end of the first switch set, namely, the collecting electrode of the eighth triode Q8 outputs high level, the power supply circuit is charged, and the power supply circuit discharges so as to supply power to the control unit 2.

The power supply circuit includes an energy storage element C6B, a rectifier D30 and a thirtieth resistor R30, one end of the energy storage element G6B is electrically connected to the output end of the first switch set, namely, one end of the energy storage element C6B is respectively connected to the collecting electrode of the eighth triode Q8 and the pin 5 of the microcontroller U2, the other end of the energy storage element C6B is electrically connected to an anode end of the rectifier D30, a cathode end of the rectifier D30 is connected to one end of the thirtieth resistor R30, the other end of the thirtieth resistor R30 is electrically connected to the first switch set, namely, the other end of the thirtieth resistor R30 is connected to the collecting electrode of the seventh triode Q7.

As for the power supply circuit, the current flowing path is as follows: the current is output from the eighth triode Q8, and then finally grounded through the energy storage element C6B, the rectifier D30, the thirtieth resistor R30, the collecting electrode of the seventh triode Q7 and the emitting electrode of the seventh triode Q7 in turn. During this process, the current is reduced through the current-limiting function of the thirtieth resistor R30.

The power supply circuit further includes a voltage-stabilizing element ZD30, which is connected to the energy storage element C6B in parallel. The voltage-stabilizing element ZD30 enables the voltage of the power supply circuit to be a stable value.

This embodiment further includes an indicator LED2 which is always on after being powered on, so as to indicate the position of the lamp controller, one end of the indicator LED2 is connected to the energy storage element C6B, and the other end of the indicator LED2 is grounded. Preferably, the indicator LED2 is connected to the energy storage element C6B through the nineteenth resistor R19. Users are convenient to find the position of the lamp controller in time through the indicator LED2.

This embodiment further includes a mode selector which inputs a light flashing mode switching signal or a light timing signal to the control unit 2, and the mode selector is electrically connected to the control unit. The mode selector is the same as that in the embodiment 1, so it will not be repeated herein.

This embodiment further includes a sampling circuit, which enables the control unit 2 to know whether the second set of switch circuit outputs high level or low level, one end of the sampling circuit is connected to the output end of the second set of switch circuit, and the other end of the sampling circuit is electrically connected to the control unit 2. The sampling circuit includes a thirty-third resistor R33 and a thirty-third capacitor C33, one end of the thirty-third resistor R33 is connected to the output end of the second set of switch circuit, namely, connected to the load connecting part B, the other end of the thirty-third resistor R33 is respectively connected to the pin 9 of the microcontroller U2 and one end of the thirty-third capacitor C33, and the other end of the thirty-third capacitor C33 is grounded. The thirty-third resistor R33 is used for limiting current, so as to reduce the current, and the thirty-third capacitor C33 is used for filtering.

After acquiring the voltage output by the sampling circuit, the microcontroller U2 judges whether the output end of the second set of switch circuit outputs high level or low level in real time, so as to precisely output the trigger signal to the first toggle switch Q31 or the second toggle switch Q32.

Figure 7:
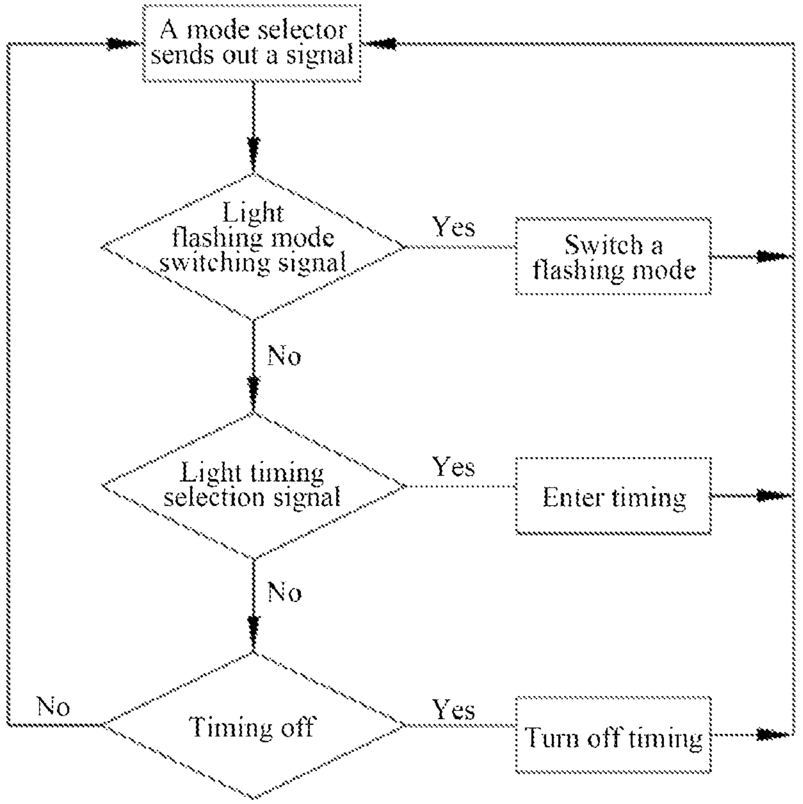
FIG. 7 is a flow diagram of a control method for a lamp.

As shown in FIG. 7, this embodiment further provides a control method for a lamp, including the following steps:

S1: after being powered on, the control unit 2 outputs a control signal, and the control unit 2 receives a switching signal input by the mode selector; if a memory chip U3 is available in the controller, the memory chip U3 will record the control signal with a light-emitting mode output by the current control unit 2 after power failure of the last working; and after next power-on, the control unit 2 reads the control signal with the light-emitting mode output last time from the memory chip U3, and the control signal with the light-emitting mode is output after power-on. If the memory chip U3 is not available in the controller, the control unit 2 will output a light-emitting mode according to program setting. The mode selector is the key switch SW or the touch switch connected to the control unit 2, and the mode selector may also adopt the wireless signal transmitter.

S2: if the control unit 2 judges the switching signal input by the mode selector as the light flashing mode switching signal, the control unit 2 outputs the control signal for switching the flashing mode to the switch unit 3, and the control signal for switching the flashing mode controls the sequence to turn on or turn off the switch unit 3.

In S2, the basis that the control unit 2 judges the switching signal input by the mode selector as the light flashing mode switching signal is as follows: the mode selector is pressed once, and the pressing time is less than or equal to first time set by the control unit 2. For example, the single pressing time does not exceed one second. The key switch SW or the touch switch is turned on or turned off by pressing, the preferred way is that the key switch SW or the touch switch is turned on, therefore the single pressing time does not exceed one second, meaning that the time for turning on the key switch SW or the touch switch does not exceed one second when pressing once.

A plurality of selection buttons are arranged on the wireless signal transmitter, the wireless signal transmitter can send out a corresponding coded signal after operating each selection button, the coded signal corresponding to each button is inconsistent, the control unit 2 compares the received coded signals with the coded signal, so as to identify the specific mode corresponding to the coded signals, for example, the flashing mode or timing mode of the lamp 3*a*.

If the wireless coded signal for switching the flashing mode is output by the wireless signal transmitter, the control unit 2 outputs the control signal for changing the flashing mode of the lamp 3*a* after receiving and identifying the wireless coded signal for switching the flashing mode sent by the wireless signal transmitter through the wireless signal receiver U4.

S3: if the control unit 2 judges the switching signal input by the mode selector as the light timing signal, the control unit 2 controls the operation for outputting and timing the control signal according to the input of the mode selector, and when the timing is end, the control unit 2 stops outputting the control signal; and at this time, the lamp is extinguished.

In S3, the basis that the control unit 2 judges the switching signal input by the mode selector as the light timing signal is as follows: the mode selector is pressed for several times in second time set by the control unit 2; for example, the key switch SW or the touch switch is pressed continuously twice within one second, namely, the second time is within one second. Therefore, the control unit 2 acquires two continuous signals for turning on the mode selector within one second, so as to judge that user makes the lamp enter the working mode of timing through the mode selector.

In S3, the basis that the control unit 2 judges the switching signal input by the mode selector as the light timing signal may also be: the time for continuously pressing the model selector is greater than or equal to third time set by the control unit 2, for example, the time for continuously pressing the key switch SW is greater than two seconds, namely, the third time is greater than two seconds.

After entering the timing mode, if the control unit 2 further receives a light flashing mode switching signal, the flashing mode is switched according to the way in S2 under the timing mode.

After entering the timing mode in a case that the mode selector adopts the key switch SW or the touch switch, if the control unit 2 receives the switching signal input by the mode selector again as the light timing signal, the timing is turned off.

If the timing mode is selected in a wireless manner, the control unit 2 receives the code for timing sent by the wireless signal transmitter through the wireless signal receiver U4, for example, the control unit 2 is used for starting timing after acquiring a second code and setting the time of the timing work, for example, the lamp 3*a* is extinguished after working for six hours. Certainly, a plurality of codes for timing may be sent through the wireless signal transmitter, for example, the wireless signal transmitter may also send a third code for timing, and the third code for timing enables the lamp 3*a* to be extinguished after working for eight hours. The control unit 2 starts timing after being used for the timing code, and the control unit 2 turns off timing after receiving the code signal for cancelling the timing.

When FIG. 4 or FIG. 5 is connected to any one of FIG. 11*a* to FIG. 36*f*, or FIG. 8 to FIG. 10 is any one control unit and switch unit in the FIG. 37*a* to FIG. 42*f*, the control of the controller for each lamp is applicable to the above method.

The control method of the present disclosure is not limited to the above embodiments, for example:

(a) In S2, the basis that the control unit 2 judges the switching signal input by the mode selector as the light timing signal is as follows: the mode selector is pressed for several times in the second time set by the control unit 2; for example, the key switch SW or the touch switch is pressed continuously twice within one second.

(b) In S2, the basis that the control unit 2 judges the switching signal input by the mode selector as the light flashing mode switching signal is as follows: the time for continuously pressing the model selector is greater than or equal to the third time set by the control unit 2, for example, the time for continuously pressing the key switch SW is greater than two seconds.

(c) In S3, the basis that the control unit 2 judges the switching signal input by the mode selector as the light timing signal is as follows: the mode selector is pressed once, and the pressing time is less than or equal to the first time set by the control unit 2. For example, the pressing time does not exceed one second.

The above control method is based on the fact that the controller can respectively switch the light flashing mode switching signal and the light timing signal. Some controllers only need to switch the light timing, the light flashing mode is automatically achieved by the program, so switching is not required. For example, if eight flashing modes are available, the signal is output and circulated in turn according to the eight flashing modes after power-on. For this controller, the present disclosure further configures the following control method:

After power-on, the control unit 2 outputs the control signal which enables the lamp to work, and the control signal has the eight inherent circular flashing modes illustrated above. If the control unit 2 receives the timing switching signal sent by the model selector, the control unit 2 switches the operation for outputting and timing the control signal according to the input of the mode selector, and when the timing is end, the control unit 2 stops outputting the control signal.

The mode selector is the key switch SW or the touch switch connected to the control unit 2, the basis that the control unit 2 judges the timing switching signal sent by the mode selector is as follows: the mode selector is pressed once, and the pressing time is less than or equal to the first time set by the control unit 2, for example, the first time is within one second; or the mode selector is pressed for several times within the second time set by the control unit 2, for example, the key switch SW or the touch switch is continuously pressed twice within one second. Or the time for continuously pressing the model selector is greater than or equal to the third time set by the control unit 2, and the time for continuously pressing the key switch SW is greater than two seconds.

Regardless of the working mode after power-on or the working mode entering the timing, the light brightness or the switch controller may also be switched by operating the key switch SW or the touch switch, for example, the mode selector is pressed once, and the pressing time is less than or equal to the first time set by the control unit 2, for example, the first time is within one second; or the mode selector is pressed for several times within the second time set by the control unit 2, for example, the key switch SW or the touch switch is continuously pressed twice within one second. Or the time for continuously pressing the model selector is greater than or equal to the third time set by the control unit 2, and the time for continuously pressing the key switch SW is greater than two seconds. For another example, the controller is turned on or turned off when the time for continuously pressing the mode selector is greater than or equal to the third time set by the control unit 2.

The operation for the timing mode and the operation for switching the light brightness are achieved by operating the same key switch, but the signal sending mode is different. For example, when switching the brightness by pressing the mode selector once within the first time, the mode selector is pressed for several times within the second time set by the control unit 2, so as to enter or exit the timing mode, namely, the operations of timing, dimming and turning on/off the controller are not overlapped.

Certainly, all the above operations may also adopt two key switches SW or two touch switches, one key switch SW or touch switch is used for switching the light brightness or turning on/off the controller, and the other key switch SW or touch switch is used for entering or exiting the timing.

What is claimed is:

1. A lamp controller, comprising a DC power supply (1) and a switch unit (3), wherein an output end of the DC power supply (1) is electrically connected to the switch unit (3), the switch unit (3) comprises a first switch set, a second switch set and a control module (U1A) for controlling the first switch set and the second switch set to be turned on alternately, an output end of the control module (U1A) is electrically connected to the first switch set, and the output end of the control module (U1A) forms a second set of switch circuit after being electrically connected to the second switch set; and the lamp controller further comprises a control unit (2), which is electrically connected to the switch unit (3);

the switch unit (3) further comprises:

a first toggle switch (Q31), which forms a first set of switch circuit after being electrically connected to an output end of the first switch set and the control unit (2) in respective; and a second toggle switch (Q32), which forms a third set of switch circuit after being electrically connected to the output end of the first switch set and the control unit (2) in respective.

2. The lamp controller according to claim 1, wherein the first switch set comprises a seventh triode (Q7) and an eighth triode (Q8), a base electrode of the seventh triode (Q7) is connected to an output end of the control module (U1A), an emitting electrode of the seventh triode (Q7) is grounded, a collecting electrode of the seventh triode (Q7) is respectively connected to a base electrode of the eighth triode (Q8) and an output end of the DC power supply (1), an emitting electrode of the eighth triode (Q8) is connected to the output end of the DC power supply (1), and a collecting electrode of the eighth triode (Q8) is electrically connected to the first toggle switch (Q31) and the second toggle switch (Q32) in respective.

3. The lamp controller according to claim 1, wherein the second switch set comprises a ninth triode (Q9) and a tenth triode (Q10), a base electrode of the ninth triode (Q9) is connected to the output end of the control module (U1A), an emitting electrode of the ninth triode (Q9) is grounded, a collecting electrode of the ninth triode (Q9) is respectively connected to a base electrode of the tenth triode (Q10) and the output end of the DC power supply (1), an emitting electrode of the tenth triode (Q10) is connected to the output end of the DC power supply (1), and a collecting electrode of the tenth triode (Q10) is the output end of the second set of switch circuit.

4. The lamp controller according to claim 1, wherein the first toggle switch (Q31) and the second toggle switch (Q32) are thyristors.

5. The lamp controller according to claim 1, further comprising a power supply circuit which supplies power to the control unit (2), the output end of the first switch set is also connected to the power supply circuit, and the power supply circuit is electrically connected to the control unit (2).

6. The lamp controller according to claim 5, wherein the power supply circuit comprises an energy storage element (C6B), a rectifier (D30) and a thirtieth resistor (R30), one end of the energy storage element (G6B) is electrically connected to the output end of the first switch set, the other end of the energy storage element (C6B) is electrically connected to an anode end of the rectifier (D30), a cathode end of the rectifier (D30) is connected to one end of the thirtieth resistor (R30), and the other end of the thirtieth resistor (R30) is electrically connected to the first switch set.

7. The lamp controller according to claim 5, further comprising a voltage-stabilizing element (ZD30), which is connected to the energy storage element (C6B) in parallel.

8. The lamp controller according to claim 5, further comprising an indicator (LED2) which is always on after being powered on, so as to indicate the position of the lamp controller, one end of the indicator (LED2) is connected to the energy storage element (C6B) and the other end of the indicator (LED2) is grounded.

9. The lamp controller according to claim 1, further comprising a mode selector which inputs a light flashing mode switching signal or a light timing signal to the control unit (2), and the mode selector is electrically connected to the control unit.

10. The lamp controller according to claim 1, further comprising a sampling circuit, which enables the control unit (2) to know whether the second set of switch circuit outputs high level or low level, one end of the sampling circuit is connected to the output end of the second set of switch circuit, and the other end of the sampling circuit is electrically connected to the control unit (2).

* * * * *